United States Patent
Li et al.

(10) Patent No.: US 10,397,093 B2
(45) Date of Patent: Aug. 27, 2019

(54) METHOD FOR ACQUIRING CROSS-DOMAIN SEPARATION PATHS, PATH COMPUTATION ELEMENT AND RELATED STORAGE MEDIUM

(71) Applicant: ZTE CORPORATION, Shenzhen, Guangdong Province (CN)

(72) Inventors: Xiaojian Li, Shenzhen (CN); Feng Shi, Shenzhen (CN); Gang Lu, Shenzhen (CN); Wei Sheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 166 days.

(21) Appl. No.: 15/321,738

(22) PCT Filed: Oct. 16, 2014

(86) PCT No.: PCT/CN2014/088770
§ 371 (c)(1),
(2) Date: Mar. 1, 2017

(87) PCT Pub. No.: WO2015/196646
PCT Pub. Date: Dec. 30, 2015

(65) Prior Publication Data
US 2018/0048557 A1     Feb. 15, 2018

(30) Foreign Application Priority Data
Jun. 26, 2014  (CN) .......................... 2014 1 0298268

(51) Int. Cl.
*H04L 12/715* (2013.01)
*H04L 12/735* (2013.01)
*H04L 12/717* (2013.01)

(52) U.S. Cl.
CPC ............ *H04L 45/04* (2013.01); *H04L 45/128* (2013.01); *H04L 45/1283* (2013.01); *H04L 45/1287* (2013.01); *H04L 45/42* (2013.01)

(58) Field of Classification Search
CPC . H04L 45/04; H04L 45/1287; H04L 45/1283; H04L 45/128; H04L 45/42
See application file for complete search history.

(56) References Cited

U.S. PATENT DOCUMENTS

2013/0227146 A1* 8/2013 Wang .................. H04L 47/724
                                                                   709/226

FOREIGN PATENT DOCUMENTS

CN     101471853 A    7/2009
CN     101483539 A    7/2009
(Continued)

OTHER PUBLICATIONS

Rie Hayashi et al.,Inter-Domain Redundancy Path Computation Methods Based on PCE, IEICE Trans. Commun., vol. e91-B. No. 10 Oct. 2008, XP1517505A.

(Continued)

*Primary Examiner* — Omar J Ghowrwal
(74) *Attorney, Agent, or Firm* — Ling Wu; Stephen Yang; Ling and Yang Intellectual Property

(57) ABSTRACT

A method for acquiring a cross-domain separation path includes: when receiving a cross-domain separation path computation request, acquiring K pairs of candidate separation domain sequences according to a cross-domain network abstraction topology; traversing the K pairs of sequences, generating corresponding intra-domain path computation requests for various domains through which candidate separation domain sequences in the network pass to transmit; when receiving at least one pair of intra-domain paths for the request, configuring each of the at least one pair (Continued)

of intra-domain paths to a corresponding position in the K pairs of sequences, to form K pairs of candidate cross-domain separation paths; and determining one pair of cross-domain separation paths from the K pairs of paths as a computation result of the cross-domain separation path computation request to transmit. There are also disclosed another method for acquiring a cross-domain separation path, a path computation element, and a computer storage medium.

9 Claims, 9 Drawing Sheets

(56) References Cited

FOREIGN PATENT DOCUMENTS

| | | |
|---|---|---|
| CN | 102065006 A | 5/2011 |
| CN | 102201993 A | 9/2011 |
| CN | 102868607 A | 1/2013 |
| CN | 103532615 A | 1/2014 |
| EP | 2173069 A1 | 4/2010 |
| WO | WO-2012062050 A1 * 5/2012 ........... H04L 47/724 |

OTHER PUBLICATIONS

Office Action dated May 5, 2019 for Chinese Patent Application No. 201410298268.8 and English Translation.

* cited by examiner

METHOD FOR ACQUIRING CROSS-DOMAIN SEPARATION PATHS, PATH COMPUTATION ELEMENT AND RELATED STORAGE MEDIUM

TECHNICAL FIELD

The present disclosure relates to a path acquisition method, and in particular, to a method for acquiring a cross-domain separation path, a related Path Computation Element (PCE), and a related computer storage medium.

BACKGROUND OF THE RELATED ART

In a cross-domain MultiProtocol Label Switching Traffic Engineering (MPLS-TE) and Generalized MultiProtocol Label Switching (GMPLS) network, due to requirements for management, geographic positions, and switching environments, the network may be divided into multiple domains and one domain is connected to another domain through a link between boundary nodes which egress and ingress the domains. This link connection is commonly referred to as a Label Switching Path (LSP) in a multi-domain network environment.

In the multi-domain network environment, two LSPs are usually configured for each bearer service. One LSP is called a working path and the other LSP is called a protection path (backup path), in case when the working path fails, the protection path is used for transmission of services. On the basis of this, the protection path configured for the working path is a path having the same source node and destination node as those on the working path, but having other nodes, links and Share Risk Link Group (SRLGs) etc. which are completely separated (different) from those of the working path.

For the cross-domain separation (disjoint) path computation method, the Internet communication protocol standard RFC5298 proposes two basic methods, one is sequential path computation and the other is simultaneous path computation. Herein, as a working path is computed prior to a protection path in the sequential path computation, nodes and links of a working path in each domain have been determined before a protection path is computed. At the same time, the protection path to be computed needs to satisfy a constraint condition that its respective nodes, links, and SRLGs are all separated from those of the working path. When there are some limitations, for example, nodes or links selected for the working path which is computed firstly are unreasonable, it will lead to a failure in computing a protection path which is separated from the nodes, links and SRLGs of the working path in a domain, thereby resulting in a failure in the cross-domain separation path computation. For the simultaneous path computation, a success ratio of the sequential path computation for acquisition of a cross-domain separation path is theoretically increased, but a domain sequence between a head domain and a tail domain of a cross-domain end-to-end path needs to be known in advance before this method is used.

SUMMARY

In order to solve the existing technical problem, the embodiments of the present disclosure aim to provide a method for acquiring a cross-domain separation path, a related path computation element and a computer storage medium, which can improve a success ratio of acquisition of a cross-domain separation path, and a domain sequence between a head domain and a tail domain of an end-to-end path needs not to be known in advance.

Technical solutions of the embodiments of the present disclosure are achieved as follows:

An embodiment of the present disclosure provides a method for acquiring a cross-domain separation path, including:

when a cross-domain separation path computation request is received, acquiring K pairs of candidate separation domain sequences according to a cross-domain network abstraction topology;

traversing the K pairs of candidate separation domain sequences, generating corresponding intra-domain path computation requests for various domains through which candidate separation domain sequences in the network pass, and transmitting the intra-domain path computation requests of the various domains;

when at least one pair of intra-domain paths for the intra-domain path computation request are received, configuring each intra-domain path of the at least one pair of intra-domain paths to a corresponding position in the K pairs of candidate separation domain sequences, to form K pairs of candidate cross-domain separation paths;

determining one pair of cross-domain separation paths from the K pairs of candidate cross-domain separation paths, and transmitting the cross-domain separation paths as a computation result of the cross-domain separation path computation request;

where K is a positive integer.

In the above solution, acquiring the K pairs of candidate separation domain sequences according to the cross-domain network abstraction topology includes:

initializing K, initializing a positive integer j to be 1, and computing a working path domain sequence in a first pair of candidate separation domain sequences from the K pairs of candidate separation domain sequences from a head node to a tail node of the network using a preset shortest path algorithm according to an inter-domain topology consisted of ingress and egress boundary nodes and inter-domain links of various domains; herein the head node and the tail node are carried in the cross-domain separation path computation request;

computing a protection path domain sequence in the first pair of candidate separation domain sequences using the shortest path algorithm by taking pass-through paths of the working path domain sequence in the first pair of candidate separation domain sequences as a separation constraint condition;

adding 1 to j, judging whether j+1 is greater than the positive integer K, and when it is judged that j+1 is not greater than K, computing a working path domain sequence in a second pair of candidate separation domain sequences which is sub-optimal relative to the working path domain sequence in the first pair of candidate separation domain sequences using a preset K-optimal path algorithm;

computing a protection path domain sequence in the second pair of candidate separation domain sequences using the shortest path algorithm by taking pass-through paths of the working path domain sequence in the second pair of candidate separation domain sequences as a separation constraint condition;

adding 1 to j again, judging whether j+1 is greater than the positive integer K, and when it is judged that j+1 is not greater than K, computing a working path domain sequence in a third pair of candidate separation domain sequences which is sub-optimal relative to the working path domain sequence in the second pair of candidate separation domain sequences using the preset K-optimal path algorithm;

computing a protection path domain sequence in the third pair of candidate separation domain sequences using the shortest path algorithm by taking pass-through paths of the working path domain sequence in the third pair of candidate separation domain sequences as a separation constraint condition;

and so on, until it is judged that j+1 is greater than K, and the process ends.

In the above solution, traversing the K pairs of candidate separation domain sequences, and generating corresponding intra-domain path computation requests for various domains in the network includes:

for a head domain of the various domains, generating an associated path computation request each time a pair of candidate separation domain sequences in the K pairs of candidate separation domain sequences is traversed; acquiring an associated path computation request generated for a $j1^{th}$ pair of candidate sequences, and determining the associated path computation request as a first association request; acquiring an associated path computation request generated for a $j2^{th}$ pair of candidate sequences, and determining the associated path computation request as a second association request; and in the K pairs of candidate separation domain sequences, there is an egress boundary node of a working path domain sequence in the $j1^{th}$ pair of candidate sequences in the head domain which is the same as an egress boundary node of a working path domain sequence in the $j2^{th}$ pair of candidate sequences in the head domain, and when an egress boundary node of a protection path domain sequence in the $j1^{th}$ pair of candidate sequences in the head domain is the same as an egress boundary node of a protection path domain sequence in the $j2^{th}$ pair of candidate sequences in the head domain, merging the first association request and the second association request into an associated path computation request, and using the merged associated path computation request as an intra-domain path computation request of the head domain;

for a tail domain of the various domains, generating an associated path computation request each time a pair of candidate separation domain sequences in the K pairs of candidate separation domain sequences is traversed; acquiring an associated path computation request generated for a $j1^{th}$ pair of candidate sequences, and determining the associated path computation request as a first association request; acquiring an associated path computation request generated for a $j2^{th}$ pair of candidate sequences, and determining the associated path computation request as a second association request; and in the K pairs of candidate separation domain sequences, there is an ingress boundary node of a working path domain sequence in the $j1^{th}$ pair of candidate sequences in the tail domain which is the same as an ingress boundary node of a working path domain sequence in the $j2^{th}$ pair of candidate sequences in the tail domain, and when an ingress boundary node of a protection path domain sequence in the $j1^{th}$ pair of candidate sequences in the tail domain is the same as an ingress boundary node of a protection path domain sequence in the $j2^{th}$ pair of candidate sequences in the tail domain, merging the first association request and the second association request into an associated path computation request, and using the merged associated path computation request as an intra-domain path computation request of the tail domain;

for an intermediate domain of the various domains, when a working path domain sequence and a protection path domain sequence in a $j^{th}$ pair of candidate separation domain sequences in the K pairs of candidate separation domain sequences pass through the intermediate domain, traversing the $j^{th}$ pair of candidate separation domain sequences and generating an associated path computation request for the $j^{th}$ pair of candidate separation domain sequences; acquiring an associated path computation request generated for a $j1^{th}$ pair of candidate sequences, and determining the associated path computation request as a first association request; acquiring an associated path computation request generated for a $j2^{th}$ pair of candidate sequences, and determining the associated path computation request as a second association request; and in at least two pairs of candidate separation domain sequences in which a working path domain sequences and a protection path domain sequence pass through the intermediate domain, there are ingress and egress boundary nodes of a working path domain sequence in the $j1^{th}$ pair of candidate sequences in the intermediate domain which are correspondingly the same as ingress and egress boundary nodes of a working path domain sequence in the $j2^{th}$ pair of candidate sequences in the intermediate domain, and when ingress and egress boundary nodes of a protection path domain sequence in the $j1^{th}$ pair of candidate sequences in the intermediate domain are correspondingly the same as ingress and egress boundary nodes of a protection path domain sequence in the $j2^{th}$ pair of candidate sequences in the intermediate domain, merging the first association request and the second association request into an associated path computation request, and using the merged associated path computation request as an intra-domain path computation request of the intermediate domain; and for an intermediate domain of the various domains, when only one of a working path domain sequence and a protection path domain sequence in the $j^{th}$ pair of candidate separation domain sequences in the K pairs of candidate separation domain sequences passes through the intermediate domain, generating a non-associated path computation request for a domain sequence which passes through the intermediate domain; acquiring a non-associated path computation request generated for a working path domain sequence or a protection path domain sequence of a $j1^{th}$ pair of candidate sequences, and determining the non-associated path computation request as a first non-association request; acquiring a non-associated path computation request generated for a working path domain sequence or a protection path domain sequence of a $j2^{th}$ pair of candidate sequences, and determining the non-associated path computation request as a second non-association request; and when ingress and egress domain boundary nodes of a domain sequence corresponding to the first non-associated path computation request in the intermediate domain are the same as ingress and egress domain boundary nodes of a domain sequence corresponding to the second non-associated path computation request in the intermediate domain, merging the first non-association request and the second non-association request, and using the merged non-associated path computation request as an intra-domain path computation request of the intermediate domain;

herein, j, j1 and j2 are positive integers, $1 \le j \le K$, $1 \le j1 \le K$, $1 \le j2 \le K$ and $j1 \ne j2$.

In the above solution, configuring each intra-domain path of the at least one pair of intra-domain paths to a corresponding position in the K pairs of candidate separation domain sequences, to form K pairs of candidate cross-domain separation paths includes:

in the K pairs of candidate separation domain sequences, configuring intra-domain paths in pass-through domains corresponding to a working path domain sequence in a $j^{th}$ pair of candidate separation domain sequences to corresponding positions of a working path in the $j^{th}$ pair of candidate separation domain sequences, and configuring intra-domain paths in pass-through domains corresponding to a protection path domain sequence in the $j^{th}$ pair of candidate separation domain sequences to corresponding positions of a protection path in the $j^{th}$ pair of candidate separation domain sequences, to form the K pairs of candidate cross-domain separation paths;

herein j is a positive integer and $1 \le j \le K$.

In the above solution, determining one pair of cross-domain separation paths from the K pairs of candidate cross-domain separation paths includes:

computing a path cost of a working path and a path cost of a protection path in each of the K pairs of candidate cross-domain separation paths;

summing the path cost of the working path and the path cost of the protection path in each pair of candidate cross-domain separation paths to form a path cost sum; and selecting candidate cross-domain separation paths with a minimum path cost sum as the cross-domain separation paths.

An embodiment of the present disclosure further provides a method for acquiring a cross-domain separation path, including:

when a cross-domain separation path computation request of a node is received, one of at least one sub-Path Computation Element (PCE) which is used to administer a domain to which the node belongs transmitting the cross-domain separation path computation request;

each of the at least one sub-PCE determining a type of an intra-domain path computation request received by the sub-PCE itself, acquiring at least one pair of intra-domain paths in a domain administered by the sub-PCE itself according to the type and domain boundary nodes carried in the intra-domain path computation request, and transmitting the acquired intra-domain paths; and receiving a cross-domain separation path computation result for the cross-domain separation path computation request and transmitting the received cross-domain separation path computation result to the node.

In the above solution, each of the at least one sub-PCE determining a type of the intra-domain path computation request received by the sub-PCE itself, acquiring at least one pair of intra-domain paths in a domain to which the sub-PCE itself belongs according to the type and the domain boundary nodes carried in the intra-domain path computation request includes:

when a type of an intra-domain path computation request received by a sub-PCE which is used to compute intra-domain paths in a head domain is an associated path computation request, computing intra-domain paths in the head domain for each associated path computation request according to an egress boundary node of the head domain carried in the associated path computation request using a preset simultaneous disjoint path algorithm;

when a type of an intra-domain path computation request received by a sub-PCE which is used to compute intra-domain paths in a tail domain is an associated path computation request, computing intra-domain paths in the tail domain for each associated path computation request according to an ingress boundary node of the tail domain carried in the associated path computation request using the preset simultaneous disjoint path algorithm; and when a type of an intra-domain path computation request received by a sub-PCE which is used to compute intra-domain paths in an intermediate domain includes an associated path computation request and a non-associated path computation request, for the associated path computation request, computing disjoint working path and protection path corresponding to the working path in the intermediate domain for each association request according to ingress and egress boundary nodes of the intermediate domain carried in the associated path computation request using the preset simultaneous disjoint path algorithm, and aggregating the working path and the protection path as the intra-domain paths; and for the non-associated path computation request, computing a single path in the intermediate domain according to ingress and egress boundary nodes of the intermediate domain carried in the non-association request using a preset shortest path algorithm and/or a K-optimal path algorithm, and using the single path as the intra-domain path.

In the above solution, the method further includes:

when the sub-PCE which is used to compute the intra-domain paths in the head domain receives the associated path computation request, newly adding a virtual node in an intra-domain topology of the head domain and newly adding virtual links through which the virtual node is connected to first and second egress boundary nodes;

forming an intra-domain path computation topology of the head domain according to the virtual node and the virtual links;

in the intra-domain path computation topology of the head domain, computing a pair of shortest disjoint paths from a head node to the virtual node in the head domain using the preset simultaneous disjoint path algorithm;

separating a path from the head node to the first egress boundary node of the head domain from the pair of shortest disjoint paths to form an intra-domain working path;

separating a path from the head node to the second egress boundary node of the head domain from the pair of shortest disjoint paths to form an intra-domain protection path; and using the intra-domain working path and the intra-domain protection path as the intra-domain paths in the head domain;

herein, the first egress boundary node is an egress boundary node of a working path domain sequence of a $j^{th}$ pair of candidate separation domain sequences in the K pairs of candidate separation domain sequences acquired by the sub-PCE in the head domain; and the second egress boundary node is an egress boundary node of a protection path domain sequence of the $j^{th}$ pair of candidate separation domain sequences in the K pairs of candidate separation domain sequences acquired by the sub-PCE in the head domain, where K and j are positive integers, and $1 \le j \le K$.

In the above solution, the method further includes:

when the sub-PCE which is used to compute the intra-domain paths in the tail domain receives the associated path computation request, newly adding a virtual node in an intra-domain topology of the tail domain and newly adding virtual links through which the virtual node is connected to first and second ingress boundary nodes;

forming an intra-domain path computation topology of the tail domain according to the virtual node and the virtual links;

in the intra-domain path computation topology of the tail domain, computing a pair of shortest disjoint paths from the virtual node to a tail node in the tail domain using the preset simultaneous disjoint path algorithm;

separating a path from the first ingress boundary node to the tail node in the tail domain from the pair of shortest disjoint paths to form an intra-domain working path;

separating a path from the second ingress boundary node to the tail node in the tail domain from the pair of shortest disjoint paths to form an intra-domain protection path; and using the intra-domain working path and the intra-domain protection path as the intra-domain paths in the tail domain;

herein, the first ingress boundary node is an ingress boundary node of a working path domain sequence of a $j^{th}$ pair of candidate separation domain sequences in the K pairs of candidate separation domain sequences acquired by the sub-PCE in the tail domain; and the second ingress boundary node is an ingress boundary node of a protection path domain sequence of the $j^{th}$ pair of candidate separation domain sequences in the K pairs of candidate separation domain sequences acquired by the sub-PCE in the tail domain, where K and j are positive integers, and $1 \leq j \leq K$.

In the above solution, the method further includes:

when the sub-PCE which is used to compute the intra-domain paths in the intermediate domain receives the associated path computation request, newly adding a first virtual node and a second virtual node in an intra-domain topology of the tail domain and newly adding virtual links through which the first virtual node is connected to first and second ingress boundary nodes and virtual links through which the second virtual node is connected to first and second egress boundary nodes;

forming an intra-domain path computation topology of the intermediate domain according to the first virtual node, the second virtual node and the virtual links;

in the intra-domain path computation topology of the intermediate domain, computing a pair of shortest disjoint paths from the first virtual node to the second virtual node using the preset simultaneous disjoint path algorithm;

separating a path from the first ingress boundary node of the intermediate domain to the first egress boundary node of the intermediate domain from the pair of shortest disjoint paths to form an intra-domain working path;

separating a path from the second ingress boundary node of the intermediate domain to the second egress boundary node of the intermediate domain from the pair of shortest disjoint paths to form an intra-domain protection path; and using the intra-domain working path and the intra-domain protection path as the intra-domain paths in the intermediate domain;

herein, the first ingress boundary node is an ingress boundary node of a working path domain sequence of a $j^{th}$ pair of candidate separation domain sequences in the K pairs of candidate separation domain sequences acquired by the sub-PCE in the intermediate domain, and the first egress boundary node is an egress boundary node of the working path domain sequence in the intermediate domain; and the second ingress boundary node is an ingress boundary node of a protection path domain sequence of the $j^{th}$ pair of candidate separation domain sequences in the K pairs of candidate separation domain sequences acquired by the sub-PCE in the intermediate domain, and the second egress boundary node is an egress boundary node of the protection path domain sequence in the intermediate domain;

where K and j are positive integers, and $1 \leq j \leq K$.

An embodiment of the present disclosure further provides a path computation element, including:

a first acquisition unit arranged to: when a cross-domain separation path computation request is received, acquire K pairs of candidate separation domain sequences according to a cross-domain network abstraction topology;

a first generation unit arranged to traverse the K pairs of candidate separation domain sequences, generate corresponding intra-domain path computation requests for various domains through which candidate separation domain sequences in the network pass, and transmit the intra-domain path computation requests of the various domains;

a first formation unit arranged to when at least one pair of intra-domain paths for the intra-domain path computation request are received, arrange each intra-domain path of the at least one pair of intra-domain paths to a corresponding position in the K pairs of candidate separation domain sequences, to form K pairs of candidate cross-domain separation paths;

a first determination unit arranged to determine one pair of cross-domain separation paths from the K pairs of candidate cross-domain separation paths, and a first transmission unit arranged to transmit the cross-domain separation paths as a computation result of the cross-domain separation path computation request;

herein K is a positive integer.

In the above solution, the first acquisition unit is arranged to:

initialize K, initialize a positive integer j to be 1, and compute a working path domain sequence in a first pair of candidate separation domain sequences from the K pairs of candidate separation domain sequences from a head node to a tail node of the network using a preset shortest path algorithm according to an inter-domain topology consisted of ingress and egress boundary nodes and inter-domain links of various domains; herein the head node and the tail node are carried in the cross-domain separation path computation request;

compute a protection path domain sequence in the first pair of candidate separation domain sequences using the shortest path algorithm by taking pass-through paths of the working path domain sequence in the first pair of candidate separation domain sequences as a separation constraint condition;

add 1 to j, judge whether j+1 is greater than the positive integer K, and when it is judged that j+1 is not greater than K, compute a working path domain sequence in a second pair of candidate separation domain sequences which is sub-optimal relative to the working path domain sequence in the first pair of candidate separation domain sequences using a preset K-optimal path algorithm;

compute a protection path domain sequence in the second pair of candidate separation domain sequences using the shortest path algorithm by taking pass-through paths of the working path domain sequence in the second pair of candidate separation domain sequences as a separation constraint condition;

add 1 to j again, judge whether j+1 is greater than the positive integer K, and when it is judged that j+1 is not greater than K, compute a working path domain sequence in a third pair of candidate separation domain sequences which is sub-optimal relative to the working path domain sequence in the second pair of candidate separation domain sequences using the preset K-optimal path algorithm;

compute a protection path domain sequence in the third pair of candidate separation domain sequences using the shortest path algorithm by taking pass-through paths of the working path domain sequence in the third pair of candidate separation domain sequences as a separation constraint condition;

and so on, until it is judged that j+1 is greater than K.

In the above solution, the first generation unit is arranged to:

for a head domain of the various domains, generate an associated path computation request each time a pair of candidate separation domain sequences in the K pairs of candidate separation domain sequences is traversed; acquire an associated path computation request generated for a $j1^{th}$ pair of candidate sequences, and determine the associated path computation request as a first association request; acquire an associated path computation request generated for a $j2^{th}$ pair of candidate sequences, and determine the associated path computation request as a second association request; and in the K pairs of candidate separation domain sequences, there is an egress boundary node of a working path domain sequence in the $j1^{th}$ pair of candidate sequences in the head domain which is the same as an egress boundary node of a working path domain sequence in the $j2^{th}$ pair of candidate sequences in the head domain, and when an egress boundary node of a protection path domain sequence in the $j1^{th}$ pair of candidate sequences in the head domain is the same as an egress boundary node of a protection path domain sequence in the $j2^{th}$ pair of candidate sequences in the head domain, merge the first association request and the second association request into an associated path computation request, and use the merged associated path computation request as an intra-domain path computation request of the head domain;

for a tail domain of the various domains, generate an associated path computation request each time a pair of candidate separation domain sequences in the K pairs of candidate separation domain sequences is traversed; acquire an associated path computation request generated for a $j1^{th}$ pair of candidate sequences, and determine the associated path computation request as a first association request; acquire an associated path computation request generated for a $j2^{th}$ pair of candidate sequences, and determine the associated path computation request as a second association request; and in the K pairs of candidate separation domain sequences, there is an ingress boundary node of a working path domain sequence in the $j1^{th}$ pair of candidate sequences in the tail domain which is the same as an ingress boundary node of a working path domain sequence in the $j2^{th}$ pair of candidate sequences in the tail domain, and when an ingress boundary node of a protection path domain sequence in the $j1^{th}$ pair of candidate sequences in the tail domain is the same as an ingress boundary node of a protection path domain sequence in the $j2^{th}$ pair of candidate sequences in the tail domain, merge the first association request and the second association request into an associated path computation request, and use the merged associated path computation request as an intra-domain path computation request of the tail domain;

for an intermediate domain of the various domains, when a working path domain sequence and a protection path domain sequence in a $j^{th}$ pair of candidate separation domain sequences in the K pairs of candidate separation domain sequences pass through the intermediate domain, traverse the $j^{th}$ pair of candidate separation domain sequences and generate an associated path computation request for the $j^{th}$ pair of candidate separation domain sequences; acquire an associated path computation request generated for a $j1^{th}$ pair of candidate sequences, and determine the associated path computation request as a first association request; acquire an associated path computation request generated for a $j2^{th}$ pair of candidate sequences, and determine the associated path computation request as a second association request; and in at least two pairs of candidate separation domain sequences in which a working path domain sequences and a protection path domain sequence pass through the intermediate domain, there are ingress and egress boundary nodes of a working path domain sequence in the $j1^{th}$ pair of candidate sequences in the intermediate domain which are correspondingly the same as ingress and egress boundary nodes of a working path domain sequence in the $j2^{th}$ pair of candidate sequences in the intermediate domain, and when ingress and egress boundary nodes of a protection path domain sequence in the $j1^{th}$ pair of candidate sequences in the intermediate domain are correspondingly the same as ingress and egress boundary nodes of a protection path domain sequence in the $j2^{th}$ pair of candidate sequences in the intermediate domain, merge the first association request and the second association request into an associated path computation request, and use the merged associated path computation request as an intra-domain path computation request of the intermediate domain; and for an intermediate domain of the various domains, when only one of a working path domain sequence and a protection path domain sequence in the $j^{th}$ pair of candidate separation domain sequences in the K pairs of candidate separation domain sequences passes through the intermediate domain, generate a non-associated path computation request for a domain sequence which passes through the intermediate domain; acquire a non-associated path computation request generated for a working path domain sequence or a protection path domain sequence of a $j1^{th}$ pair of candidate sequences, and determine the non-associated path computation request as a first non-association request; acquire a non-associated path computation request generated for a working path domain sequence or a protection path domain sequence of a $j2^{th}$ pair of candidate sequences, and determine the non-associated path computation request as a second non-association request; and when ingress and egress boundary nodes of a domain sequence corresponding to the first non-associated path computation request in the intermediate domain are the same as ingress and egress boundary nodes of a domain sequence corresponding to the second non-associated path computation request in the intermediate domain, merge the first non-association request and the second non-association request, and use the merged non-associated path computation request as an intra-domain path computation request of the intermediate domain;

where, j, j1 and j2 are positive integers, $1 \leq j \leq K$, $1 \leq j1 \leq K$, $1 \leq j2 \leq K$ and $j1 \neq j2$ In the above solution, the first formation unit is arranged to:

in the K pairs of candidate separation domain sequences, configure intra-domain paths in pass-through domains corresponding to a working path domain sequence in a $j^{th}$ pair of candidate separation domain sequences to corresponding positions of a working path in the $j^{th}$ pair of candidate separation domain sequences, and configure intra-domain paths in pass-through domains corresponding to a protection path domain sequence in the $j^{th}$ pair of candidate separation domain sequences to corresponding positions of a protection path in the $j^{th}$ pair of candidate separation domain sequences, to form the K pairs of candidate cross-domain separation paths;

where j is a positive integer and $1 \leq j \leq K$.

In the above solution, the first determination unit is arranged to:

compute a path cost of a working path and a path cost of a protection path in each of the K pairs of candidate cross-domain separation paths;

sum the path cost of the working path and the path cost of the protection path in each pair of candidate cross-domain separation paths to form a path cost sum; and select candidate cross-domain separation paths with a minimum path cost sum as the cross-domain separation paths.

An embodiment of the present disclosure further provides a path computation element, including:

a first transmission unit arranged to, when a cross-domain separation path computation request of a node is received, transmit the cross-domain separation path computation request;

a first determination unit arranged to determine a type of an intra-domain path computation request received by itself;

a first acquisition unit arranged to acquire at least one pair of intra-domain paths in a domain administered by itself according to the type and domain boundary nodes carried in the intra-domain path computation request, and transmit the acquired intra-domain paths; and a second transmission unit arranged to receive a cross-domain separation path computation result for the cross-domain separation path computation request and transmit the received cross-domain separation path computation result to the node.

In the above solution, the first acquisition unit is located in a head domain, and is arranged to when determining that a type of an intra-domain path computation request received by itself is an associated path computation request, compute intra-domain paths in the head domain for each associated path computation request according to an egress boundary node of the head domain carried in the associated path computation request using a preset simultaneous disjoint path algorithm;

the first acquisition unit is located in a tail domain, and is arranged to when determining that a type of a received intra-domain path computation request is an associated path computation request, compute intra-domain paths in the tail domain for each associated path computation request according to an ingress boundary node of the tail domain carried in the associated path computation request using the preset simultaneous disjoint path algorithm; and the first acquisition unit is located in an intermediate domain and is arranged to when determining that a type of a received intra-domain path computation request includes an associated path computation request and a non-associated path computation request, for the associated path computation request, compute disjoint working path and protection path corresponding to the working path in the intermediate domain for each association request according to ingress and egress boundary nodes of the intermediate domain carried in the associated path computation request using the preset simultaneous disjoint path algorithm, and aggregate the working path and the protection path as the intra-domain paths; and for the non-associated path computation request, compute a single path in the intermediate domain according to ingress and egress boundary nodes of the intermediate domain carried in the non-association request using a preset shortest path algorithm and/or a K-optimal path algorithm, and use the single path as the intra-domain path.

In the above solution, the first acquisition unit is located in the head domain, and is arranged to, when it is determined that the associated path computation request is received, newly add a virtual node in an intra-domain topology of the head domain and newly add virtual links through which the virtual node is connected to first and second egress boundary nodes;

form an intra-domain path computation topology of the head domain according to the virtual node and the virtual links;

in the intra-domain path computation topology of the head domain, compute a pair of shortest disjoint paths from a head node to the virtual node in the head domain using the preset simultaneous disjoint path algorithm;

separate a path from the head node to the first egress boundary node of the head domain from the pair of shortest disjoint paths to form an intra-domain working path;

separate a path from the head node to the second egress boundary node of the head domain from the pair of shortest disjoint paths to form an intra-domain protection path; and use the intra-domain working path and the intra-domain protection path as the intra-domain paths in the head domain;

herein, the first egress boundary node is an egress boundary node of a working path domain sequence of a $j^{th}$ pair of candidate separation domain sequences in the K pairs of candidate separation domain sequences acquired by the sub-PCE in the head domain; and the second egress boundary node is an egress boundary node of a protection path domain sequence of the $j^{th}$ pair of candidate separation domain sequences in the K pairs of candidate separation domain sequences acquired by the sub-PCE in the head domain, where K and j are positive integers, and $1 \leq j \leq K$.

In the above solution, the first acquisition unit is located in the tail domain and is arranged to when it is determined that the associated path computation request is received, newly add a virtual node in an intra-domain topology of the tail domain and newly add virtual links through which the virtual node is connected to first and second ingress boundary nodes;

form an intra-domain path computation topology of the tail domain according to the virtual node and the virtual links;

in the intra-domain path computation topology of the tail domain, compute a pair of shortest disjoint paths from the virtual node to a tail node in the tail domain using the preset simultaneous disjoint path algorithm;

separate a path from the first ingress boundary node to the tail node in the tail domain from the pair of shortest disjoint paths to form an intra-domain working path;

separate a path from the second ingress boundary node to the tail node in the tail domain from the pair of shortest disjoint paths to form an intra-domain protection path; and use the intra-domain working path and the intra-domain protection path as the intra-domain paths in the tail domain;

herein, the first ingress boundary node is an ingress boundary node of a working path domain sequence of a $j^{th}$ pair of candidate separation domain sequences in the K pairs of candidate separation domain sequences acquired by the sub-PCE in the tail domain; and the second ingress boundary node is an ingress boundary node of a protection path domain sequence of the $j^{th}$ pair of candidate separation domain sequences in the K pairs of candidate separation domain sequences acquired by the sub-PCE in the tail domain, where K and j are positive integers, and $1 \leq j \leq K$.

In the above solution, the first acquisition unit is located in the intermediate domain and is arranged to, when the associated path computation request is received, newly add a first virtual node and a second virtual node in an intra-domain topology of the tail domain and newly add virtual links through which the first virtual node is connected to first and second ingress boundary nodes and virtual links through which the second virtual node is connected to first and second egress boundary nodes;

form an intra-domain path computation topology of the intermediate domain according to the first virtual node, the second virtual node and the virtual links;

in the intra-domain path computation topology of the intermediate domain, compute a pair of shortest disjoint paths from the first virtual node to the second virtual node using the preset simultaneous disjoint path algorithm;

separate a path from the first ingress boundary node of the intermediate domain to the first egress boundary node of the intermediate domain from the pair of shortest disjoint paths to form an intra-domain working path;

separate a path from the second ingress boundary node of the intermediate domain to the second egress boundary node of the intermediate domain from the pair of shortest disjoint paths to form an intra-domain protection path; and use the intra-domain working path and the intra-domain protection path as the intra-domain paths in the intermediate domain;

herein, the first ingress boundary node is an ingress boundary node of a working path domain sequence of a $j^{th}$ pair of candidate separation domain sequences in the K pairs of candidate separation domain sequences acquired by the sub-PCE in the intermediate domain, and the first egress boundary node is an egress boundary node of the working path domain sequence in the intermediate domain; and the second ingress boundary node is an ingress boundary node of a protection path domain sequence of the $j^{th}$ pair of candidate separation domain sequences in the K pairs of candidate separation domain sequences acquired by the sub-PCE in the intermediate domain, and the second egress boundary node is an egress boundary node of the protection path domain sequence in the intermediate domain;

where K and j are positive integers, and $1 \leq j \leq K$.

An embodiment of the present disclosure further provides a computer storage medium having a first set of computer-executable instructions stored therein, which is used to perform the first method for acquiring a cross-domain separation path described above.

An embodiment of the present disclosure further provides a second computer storage medium having a second set of computer-executable instructions stored therein, which is used to perform the second method for acquiring a cross-domain separation path described above.

The method for acquiring a cross-domain separation path, the related path computation element, and the related computer storage medium are disclosed according to the embodiments of the present disclosure, herein, the method includes: when a cross-domain separation path computation request is received, acquiring K pairs of candidate separation domain sequences according to a cross-domain network abstraction topology; traversing the K pairs of candidate separation domain sequences, generating corresponding intra-domain path computation requests for domains through which various candidate separation domain sequences in the network pass, and transmitting the intra-domain path computation requests of the various domains; when at least one pair of intra-domain paths for the intra-domain path computation request are received, configuring each intra-domain path of the at least one pair of intra-domain paths to a corresponding position in the K pairs of candidate separation domain sequences, to form K pairs of candidate cross-domain separation paths; determining one pair of cross-domain separation paths from the K pairs of candidate cross-domain separation paths, and transmitting the cross-domain separation paths as a computation result of the cross-domain separation path computation request; where K is a positive integer. With the embodiments of the present disclosure, a success ratio of acquisition of a cross-domain separation path can be increased, and a domain sequence between a head domain and a tail domain of an end-to-end path needs not to be known in advance.

SPECIFIC EMBODIMENTS

Optional embodiments of the present disclosure will be described in detail below with reference to accompanying drawings, and it is to be understood that the optional embodiments described hereinafter are merely for the purpose of illustration and explanation of the present disclosure and are not intended to limit the present disclosure.

In a multi-domain network environment, in order to meet the requirements for establishment of a working path and a protection path, PCEs may be used to establish an LSP. When PCEs are used to compute a cross-domain separation path, PCEs which are responsible for computing various domain paths are required to cooperate with each other to complete the computation of an end-to-end path. In order to solve the problem that the cross-domain separation path can be established without knowing in advance a domain sequence between a head domain and a tail domain of a cross-domain end-to-end path, on the basis of the current PCE architecture, the Internet communication protocol standard RFC6805 proposes a hierarchical PCE concept, that is, PCEs which are responsible for computation of intra-domain paths in various domains are considered to be sub-PCEs, a parent PCE is set for these PCEs, and the computation of the cross-domain separation path is completed by coordinating the sub-PCEs in various domains by the parent PCE. The subsequent technical solution according to the embodiments of the present disclosure is to acquire the cross-domain separation path using the hierarchical PCE conceptual model.

Embodiment one of a method for acquiring a cross-domain separation path according to the present disclosure is applied in PCEs. The PCEs include a parent PCE and at least one sub-PCE. Each sub-PCE corresponds to a corresponding domain in the network.

Figure 1:
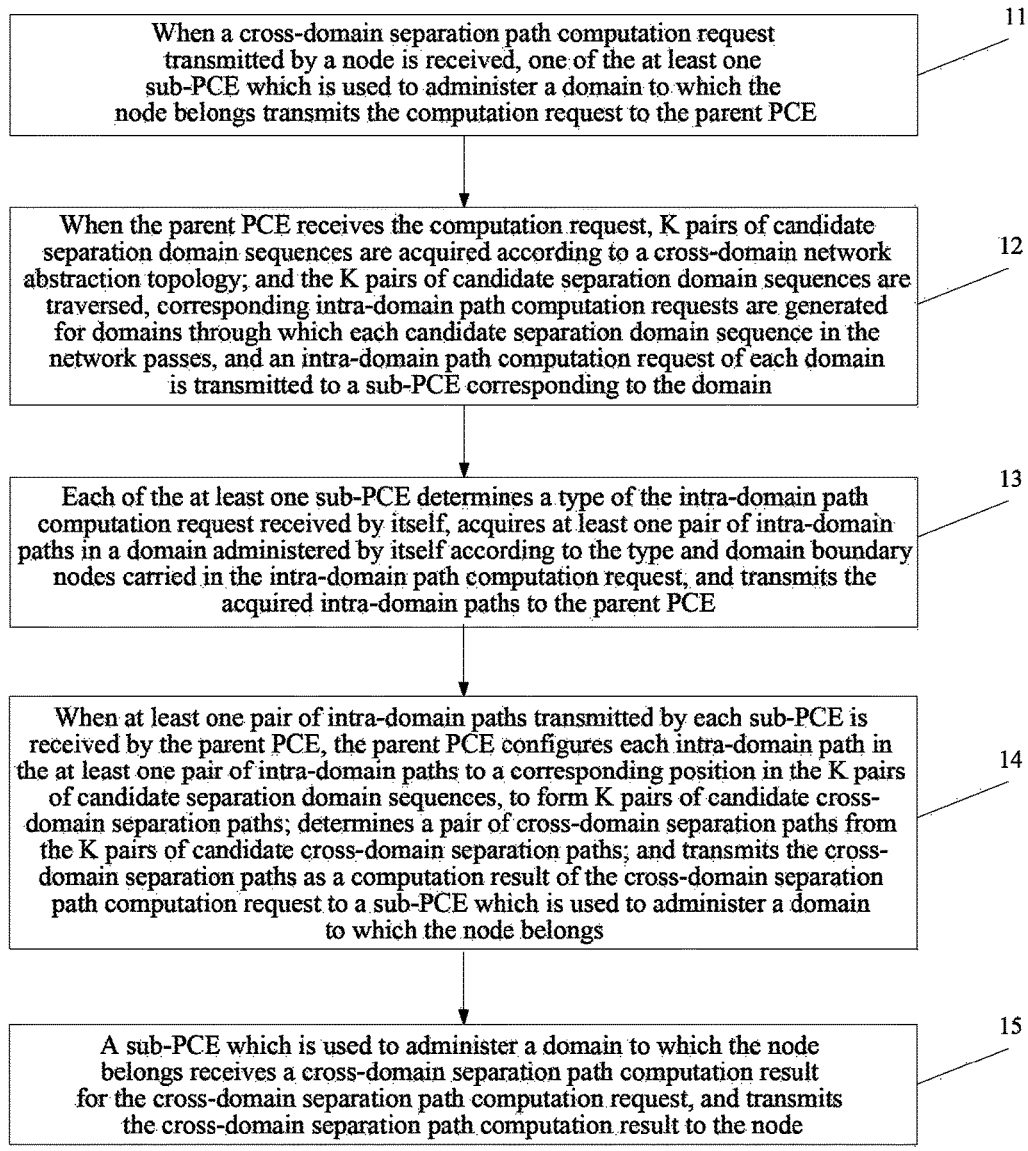
FIG. 1 is a flowchart of an implementation of embodiment one of a method for acquiring a cross-domain separation path according to the present disclosure.

FIG. 1 is a flowchart of implementation one of a method for acquiring a cross-domain separation path according to the present disclosure. As shown in FIG. 1, the method includes the following steps:

In step 11, when a cross-domain separation path computation request transmitted by a node is received, one of the at least one sub-PCE which is used to administer a domain to which the node belongs transmits the computation request to the parent PCE.

Figure 2:
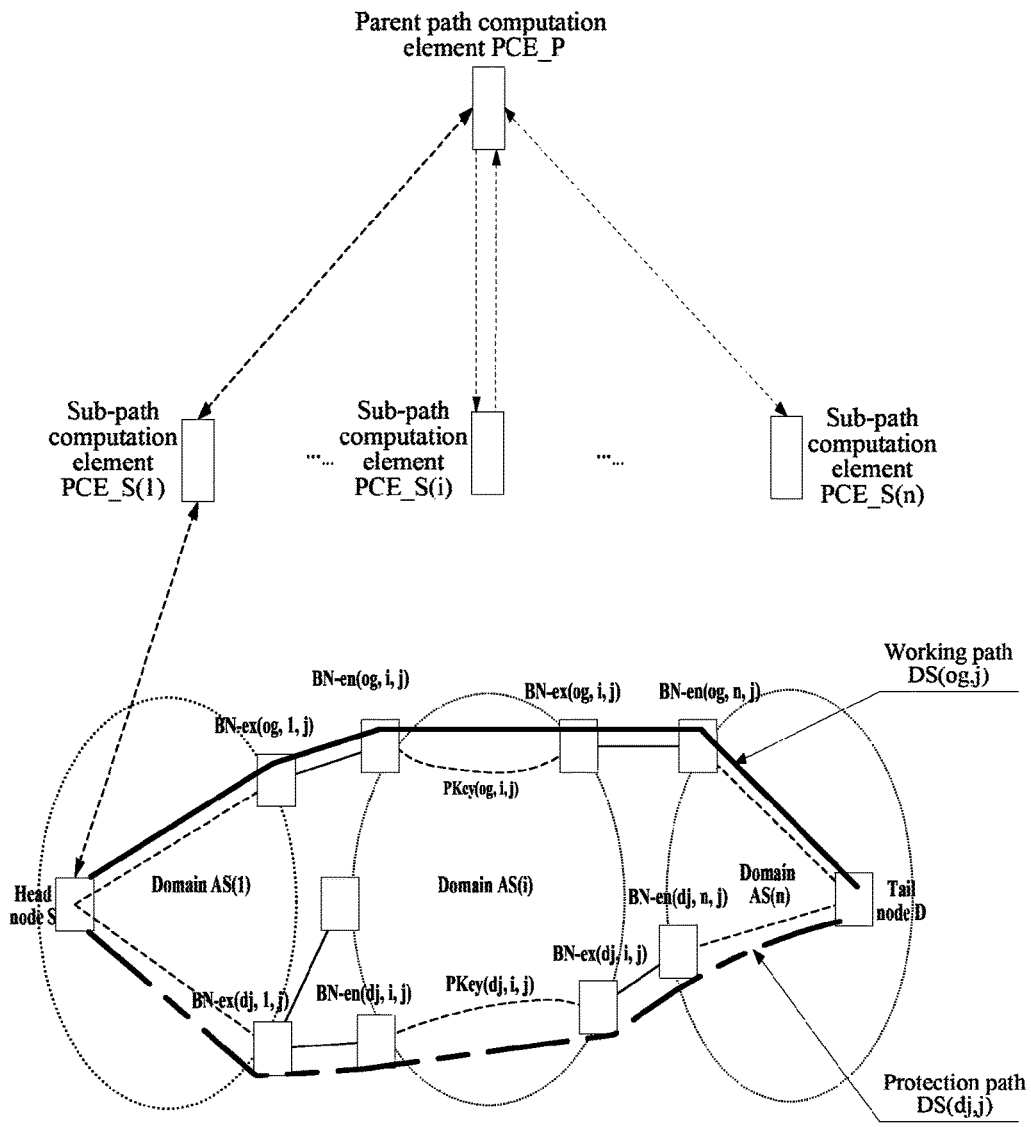
FIG. 2 is a diagram of application scenario one according to an embodiment of the present disclosure.

FIG. 2 is a diagram of application scenario one according to an embodiment of the present disclosure. The technical solution of embodiment one of the method for acquiring a cross-domain separation path according to the present disclosure can be understood in combination with FIG. 2.

As shown in FIG. 2, there are n (n is a positive integer) domains in the network, and each domain is a corresponding Autonomous System (AS), that is, a domain in the network is AS(i), wherein i is a positive integer and $1<=i<=n$.

For convenience of understanding, in the cross-domain separation path computation, AS(1) may be considered to be a head domain, AS(n) may be considered to be a tail domain, and AS(2)-AS(n−1) may be considered to be intermediate domains. In a hierarchical PCE conceptual model, a corresponding sub-PCE such as PCE_S(i) is configured for AS(i), and a parent PCE such as PCE_P is configured for all the sub-PCEs in the network.

In an embodiment, when a node S transmits a cross-domain separation path computation request to a sub-PCE which is used to administer the node S such as PCE_S(1), the PCE_S(1) transmits the cross-domain separation path computation request to the PCE_P.

In step 12, when the parent PCE receives the computation request, K pairs of candidate separation domain sequences are acquired according to a cross-domain network abstraction topology; and the K pairs of candidate separation domain sequences are traversed, corresponding intra-domain path computation requests are generated for domains through which each candidate separation domain sequence in the network passes, and an intra-domain path computation request of each domain is transmitted to a sub-PCE corresponding to the domain.

Herein, the pass-through domains include: a head domain, a tail domain, and intermediate domains through which the candidate separation domain sequence passes in the cross-domain network; and each of the K pairs of candidate separation domain sequences includes a domain sequence of a working path in candidate cross-domain separation paths and a domain sequence of a protection path corresponding to the working path in the candidate cross-domain separation paths.

Herein, K is a positive integer, which is preset and can be set flexibly according to an actual network topological structure and/or the path computation method which is used.

Here, the following parameters are appointed in combination with FIG. 2 for convenience of description of the technical solution according to the embodiments of the present disclosure.

DS(og, j) represents a pass-through domain sequence of a working path in a $j^{th}$ pair of candidate separation domain sequences, herein $1<=j<=K$;

DS(dj, j) represents a pass-through domain sequence of a protection path in the $j^{th}$ pair of candidate separation domain sequences, herein j is a positive integer and $1<=j<=K$;

BN-en(og, i, j) represents an ingress boundary node used for a working path which passes through the domain AS(i) in the $j^{th}$ pair of candidate separation domain sequences;

BN-ex(og, i, j) represents an egress boundary node used for the working path which passes through the domain AS(i) in the $j^{th}$ pair of candidate separation domain sequences;

BN-en(dj, i, j) represents an ingress boundary node used for a protection path which passes through the domain AS(i) in the $j^{th}$ pair of candidate separation domain sequences;

BN-ex(dj, i, j) represents an egress boundary node used for the working path which passes through the domain AS(i) in the $j^{th}$ pair of candidate separation domain sequences;

Pin(og, i, j) represents an intra-domain path of the working path which passes through the domain AS(i) in the $j^{th}$ pair of candidate separation domain sequences;

PKey(og, i, j) represents a PathKey used for an intra-domain path segment of the working path which passes through the domain AS(i) in the $j^{th}$ pair of candidate separation domain sequences;

Pin(dj, i, j) represents an intra-domain path of the protection path which passes through the domain AS(i) in the $j^{th}$ pair of candidate separation domain sequences;

PKey(dj, i, j) represents a PathKey used for an intra-domain path segment of the protection path which passes through the domain AS(i) in the $j^{th}$ pair of candidate separation domain sequences;

S represents a head/source node of the cross-domain separation path computation and is located in the head domain AS(1);

D represents a tail node of the cross-domain separation path computation, and is located in the tail domain AS(n);

other domains except the head domain AS(1) and the tail domain AS(n) are called intermediate domains;

SUB_REQ(i) represents an intra-domain (disjoint) path computation request transmitted by the parent PCE to the sub-PCE(i) responsible for computing the intra-domain(disjoint) path of the domain AS(i);

SUB_RSP(i) represents a set of intra-domain path computation results of the domain AS(i) transmitted by the PCE_S(i) to the PCE_P;

DP(og, j) represents a cross-domain end-to-end path corresponding to the working path in the $j^{th}$ pair of candidate separation domain sequences;

DP(dj, j) represents a cross-domain end-to-end path corresponding to the protection path in the $j^{th}$ pair of candidate separation domain sequences.

Herein, when receiving the computation request, the parent PCE acquiring K pairs of candidate separation domain sequences according to a cross-domain network abstraction topology includes:

the parent PCE, such as the PCE_P, computing the K pairs of candidate separation domain sequences in accordance with step 121 to step 124 using the sequential path computation according to an inter-domain topology consisted of ingress and egress boundary nodes and inter-domain links of various domains.

In step 121, K is initialized, j is initialized to be equal to 1, and the PCE_P computes a pass-through domain sequence DS(o, j) of a working path in a first pair of candidate cross-domain separation paths from a head node S to a tail node D using a preset shortest path algorithm, and the process continues to perform step 122.

Herein, a specific path (a working path in the first pair of candidate cross-domain separation paths) of the domain sequence DS(og, j) is (S, BN-ex(og, 1, j), BN-en(og, i, j), BN-ex(og, i, j), BN-en(og, n, j), D); and the shortest path algorithm includes, but is not limited to: the Djkstra algorithm, the Floyd algorithm, the Bellman-Ford algorithm, the Shortest Path Faster Algorithm (SPFA) algorithm.

In step 122, the PCE_P uses the path of the DS(og, j) as a separation constraint condition and computes the pass-through domain sequence DS(dj, j) of the protection path (here a domain sequence DS(dj, 1) is a domain sequence of the protection path in the first pair of candidate cross-domain separation paths) using the preset shortest path algorithm, and the process continues to perform step 123.

Herein a specific path of the domain sequence DS(dj, 1) is (S, BN-ex(dj, 1, j), BN-en(dj, j), BN-ex(dj, i, j), . . . , BN-en(dj, n, j), D); and the shortest path algorithm can be known with reference to the above description, and will not be repeated here.

In step 123, 1 is added to j, and it is judged whether j+1 is greater than K, and if it is judged that j+1 is not greater than K, the process continues to perform step 124; and when it is judged that j+1 is greater than K, the process ends.

In step 124, the PCE_P computes a domain sequence DS(og, j) of a sub-optimal working path with respect to a pass-through domain sequence DS(og, j−1) of an j−$1^{th}$ working path using the preset K-optimal path algorithm, and the process continues to perform step 122, and so on, until the K pairs of candidate separation domain sequences are computed, i.e., j+1 is greater than K in step 123.

In the above solution, the DS(o, j) and the DS(dj, j) are considered to be a pair of candidate separation domain sequences.

Herein, traversing the K pairs of candidate separation domain sequences, generating corresponding intra-domain path computation requests for various domains in the network, and transmitting an intra-domain path computation request of each domain to a sub-PCE corresponding to the domain includes:

generating an associated path computation request (association request) each time a pair of candidate separation domain sequences is traversed by the parent PCE such as the PCE_P for an intra-domain path computation request of the head domain AS(1); acquiring an association request generated for a j$1^{th}$ pair of candidate sequences, and determining the association request as a first association request; acquiring an association request generated for a j$2^{th}$ pair of candidate sequences, and determining the association request as a second association request; when in the K pairs of candidate separation domain sequences, an egress boundary node of a working path domain sequence in the j$1^{th}$ pair of candidate sequences in the head domain is the same as an egress boundary node of a working path domain sequence in the j$2^{th}$ pair of candidate sequences in the head domain, and an egress boundary node of a protection path domain sequence in the j$1^{th}$ pair of candidate sequences in the head domain is the same as an egress boundary node of a protection path domain sequence in the j$2^{th}$ pair of candidate sequences in the head domain, merging the first association request and the second association request into an association request, and merging all the generated association requests into an intra-domain path computation request, such as SUB_REQ(1), and transmitting the intra-domain path computation request to a sub-PCE which is used to compute intra-domain paths of the head domain AS(1), such as PCE_S(1), herein j1 and j2 are positive integers, 1≤j1≤K, 1≤j2≤K and j1≠j2.

It can be seen that in the head domain, the intra-domain path computation request includes at least one association request, and associated paths corresponding to a j$^{th}$ association request may be represented by ingress and egress boundary nodes in the j$^{th}$ pair of candidate separation domain sequences in the head domain. For example, in the associated paths corresponding to the j$^{th}$ association request, a working path may be expressed as: <S, BN-ex(og, 1, j)> and a protection path may be expressed as <S, BN-ex(dj, 1, j)>. In j$1^{th}$ and j$2^{th}$ associated paths, if for working paths, BN-ex(og, 1, j1)=BN-ex(og, 1, j2), and for protection paths, BN-ex(dj, 1, j1)=BN-ex(dj, 1, j2), the j$1^{th}$ association request and the j$2^{th}$ association request are merged into an association request.

Generating an associated path computation request (association request) each time a pair of candidate separation domain sequences is traversed by the parent PCE such as the PCE_P for an intra-domain path computation request of the tail domain AS(n); acquiring an association request generated for a j$1^{th}$ pair of candidate sequences, and determining the association request as a first association request; acquiring an association request generated for a j$2^{th}$ pair of candidate sequences, and determining the association request as a second association request; when in the K pairs of candidate separation domain sequences, an ingress boundary node of a working path domain sequence in the j$1^{th}$ pair of candidate sequences in the tail domain is the same as an ingress boundary node of a working path domain sequence in the j$2^{th}$ pair of candidate sequences in the tail domain, and an ingress boundary node of a protection path domain sequence in the j$1^{th}$ pair of candidate sequences in the tail domain is the same as an ingress boundary node of a protection path domain sequence in the j$2^{th}$ pair of candidate sequences in the tail domain, merging the first association request and the second association request into an association request, and merging all the generated association requests into an intra-domain path computation request, such as SUB_REQ(n), and transmitting the intra-domain path computation request to a sub-PCE which is used to compute intra-domain paths of the tail domain AS(n), such as PCE_S(n).

It can be seen that in the tail domain, the intra-domain path computation request includes at least one association request, and associated paths corresponding to a j$^{th}$ association request may be represented by ingress and egress boundary nodes of the j$^{th}$ pair of candidate separation domain sequences in the tail domain. For example, in the associated paths corresponding to the j$^{th}$ association request, a working path may be expressed as: <BN-en(og, n, j), D> and a protection path may be expressed as <BN-en(dj, n, j), D>. In j$1^{th}$ and j$2^{th}$ associated paths, if for working paths, BN-en(og, n, j1)=BN-en(og, n, j2), and for protection paths, BN-en(dj, n, j1)=BN-en(dj, n, j2), the j$1^{th}$ association request and the j$2^{th}$ association request are merged into an association request.

For an intra-domain path computation request of an intermediate domain AS(ii), herein 1<ii<n, the parent PCE, such as the PCE_P, generates an associated path computation request (association request) and/or an non-associated path computation request (non-association request) each time a pair of candidate separation domain sequences is traversed, and all the generated association requests and/or non-association requests are merged into an intra-domain path computation request such as the SUB_REQ(ii).

Specifically, when the working path domain sequence DS(og, j) and the protection path domain sequence DS(dj, j) in the $j^{th}$ pair of candidate separation domain sequences pass through the domain AS(ii), the parent PCE generates an association request for the $j^{th}$ pair of candidate separation domain sequences DS(og, j) and DS(dj, j); acquires an association request generated for the $j1^{th}$ pair of candidate sequences, and determines the association request as a first association request; acquires an association request generated for the $j2^{th}$ pair of candidate sequences, and determines the association request as a second association request; when in at least two pairs of candidate separation domain sequences in which working path domain sequences and protection path domain sequences all pass through the intermediate domain, ingress and egress boundary nodes of the working path domain sequence in the $j1^{th}$ pair of candidate sequences in the domain AS(ii) are the same as ingress and egress boundary nodes of the working path domain sequence in the $j2^{th}$ pair of candidate sequences in the domain AS(ii), and ingress and egress boundary nodes of the protection path domain sequence in the $j1^{th}$ pair of candidate sequences in the domain AS(ii) are the same as ingress and egress boundary nodes of the protection path domain sequence in the $j2^{th}$ pair of candidate sequences in the domain AS(ii), the first association request and the second association request are merged into an association request, all the generated association requests are merged into an intra-domain path computation request such as the SUB_REQ(ii), and the intra-domain path computation request is transmitted to a sub-PCE which is used to compute intra-domain paths of the domain AS(ii) such as the PCE_S (ii).

It can be seen that when the working path domain sequence DS(og, j) and the protection path domain sequence DS(dj, j) in the $j^{th}$ pair of candidate separation domain sequences pass through the domain AS(ii), associated paths corresponding to the $j^{th}$ association request may be represented by ingress and egress boundary nodes of the $j^{th}$ pair of candidate separation domain sequences in the domain AS(ii). For example, in the associated paths corresponding to the $j^{th}$ association request, the working path may be expressed as <BN-en(og, ii, j), BN-ex(og, ii, j)> and the protection path may be expressed as <BN-en(dj, ii, j), BN-ex(dj, ii, j)>. In the $j1^{th}$ and $j2^{th}$ associated paths, if for the working paths, BN-en(og, ii, j1)=BN-en(og, ii, j2) and BN-ex(og, ii j1)=BN-ex(og, ii, j2), and for the protection paths, BN-en(dj, ii, j1)=BN-en(dj, ii, j2) and BN-ex(dj, ii, j1)=BN-ex(dj, ii, j2), the $j1^{th}$ association request and the $j2^{th}$ association request are merged into an association request.

When only one of the working path domain sequence DS(og, j) and the protection path domain sequence DS(dj, j) in the $j^{th}$ pair of candidate separation domain sequences passes through the intermediate domain AS(ii), a single path computation request (non-association request) in the domain AS(ii) is generated for a domain sequence which passes through the intermediate domain AS(ii), herein the non-association request may be an independent path computation request (independent request), and the request is merged into SUB_REQ(ii). Herein, a non-association request generated for a working path domain sequence/protection path domain sequence of a $j1^{th}$ pair of candidate sequences is acquired, and is determined as a first non-association request; a non-association request generated for a working path domain sequence/protection path domain sequence of a $j2^{th}$ pair of candidate sequences is acquired, and is determined as a second non-association request; and when ingress and egress boundary nodes of the working path/protection path domain sequence in the $j1^{th}$ pair of candidate sequences are the same as ingress and egress boundary nodes of the working path/protection path domain sequence in the $j2^{th}$ pair of candidate sequences, the first non-association request and the second non-association request are merged, and the merged non-association request is transmitted to a sub-PCE which is used for computation of intra-domain paths of the domain AS(ii), such as the PCE_S(ii).

It can be seen that when only one of the working path domain sequence DS(og, j) and the protection path domain sequence DS(dj, j) of the $j^{th}$ pair of candidate separation domain sequences passes through the intermediate domain AS(ii), a non-association path corresponding to the $j^{th}$ non-association request may be represented by ingress and egress boundary nodes of the $j^{th}$ pair of candidate separation domain sequences in the domain AS(ii). For example, when only DS(og, j) passes through the intermediate domain AS(ii), the non-association path corresponding to the $j^{th}$ non-association request may be represented by <BN-en(og, ii, j), BN-ex(og, ii, j)>. For example, when DS(dj, j) passes through the domain AS(ii), the non-association path corresponding to the $j^{th}$ non-association request may be represented by <BN-en(dj, ii, j), BN-ex(dj, ii, j)>. When only DS(dj, j1) of the $j1^{th}$ pair of candidate separation domain sequences and only DS(dj, j2) of the $j2^{th}$ pair of candidate separation domain sequences pass through the domain AS(ii) and BN-en(dj, ii, j1)=BN-en(dj, ii, j2) and BN-ex(dj, ii, j1)=BN-ex(dj, ii, j2), the non-association request generated for DS(dj, j1) and the non-association request generated for DS(dj, j2) in the domain AS(ii) are merged.

In step 13, each of the at least one sub-PCE determines a type of the intra-domain path computation request received by itself, acquires at least one pair of intra-domain paths in a domain administered by itself according to the type and domain boundary nodes carried in the intra-domain path computation request, and transmits the acquired intra-domain paths to the parent PCE.

In an embodiment, when the PCE_S(i) responsible for computing each sub-domain AS(i) receives an intra-domain path computation request SUB_REQ(i) from the PCE_P, herein 1≤i≤n, for the associated path computation request, disjoint working path and protection path corresponding to the working path (intra-domain paths) in the domain AS(i) are computed according to boundary nodes which ingress and egress the domain AS(i) carried in the association request using the simultaneous disjoint path algorithm; and for the non-associated path computation request, a single intra-domain path within the domain AS(i) is computed using the shortest path algorithm and/or K-optimal path algorithm; and each PCE_S(i) returns a computation result of itself to the parent PCE, such as the PCE_P, in a response form of SUB_RSP(ii) through a standard protocol PCEP message.

Figure 3A:
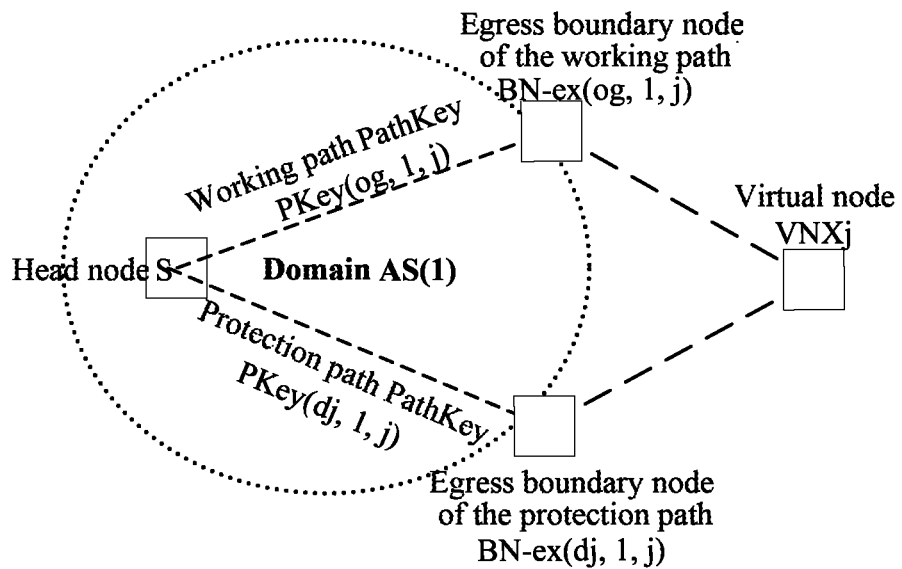
FIG. 3(a) is a topological diagram of a head domain according to an embodiment of the present disclosure.

Herein, for a sub-PCE, such as PCE_S(1), which is responsible for computing the head domain AS(1), a type of an intra-domain path computation request received by the PCE_S(1) itself is an association request, and for the association request, disjoint working path and protection path corresponding to the working path (intra-domain paths) in the head domain are computed for each association request according to an egress boundary node of the head domain carried in the association request using the simultaneous disjoint path algorithm. Specifically, in the head domain AS(1), for the $j^{th}$ associated path computation request (<S, BN-ex(og, 1, j)>, <S, BN-ex(dj, 1, j)>), as shown in FIG. 3(a), a virtual node VNXj is newly added in an intra-domain topology of the head domain AS(1) as a tail node of the domain AS(1). As a result, two newly added virtual links appear, herein a first newly added virtual link connects BN-ex(og, 1, j) and VNXj, and a second newly added virtual link connects BN-ex(dj, 1, j) and VNXj. A link cost value is preset to a certain positive integer which is much less than a minimum intra-domain link cost value. An intra-domain path computation topology of the head domain is formed according to the virtual node and the two newly added virtual links. The intra-domain path computation topology of the head domain includes the virtual node VNXj, the two newly added virtual links and the intra-domain topology of the head domain.

In the intra-domain path computation topology of the head domain AS(1), a pair of shortest disjoint paths Pin'(og, 1, j) and Pin'(dj, 1, j) from the head node S to the virtual node VNXj is computed using the simultaneous disjoint path algorithm, and a path Pin(og, 1, j) from the head node S to an egress boundary node BN-ex(og, 1, j) of the head domain AS(1) (a first egress boundary node of the head domain) is separated therefrom, herein Pin(og, 1, j) is an intra-domain working path of the head domain AS(1), and PKey(og, 1, j) is generated as a first PathKey; a path Pin(dj, 1, j) from the head node S to an egress boundary node BN-ex(dj, 1, j) of the head domain AS(1) (a second egress boundary node of the head domain) is separated from Pin'(dj, 1, j), herein Pin(dj, 1, j) is an intra-domain protection path of the head domain AS(1), and PKey(dj, 1, j) is generated as a second PathKey; and the first PathKey and the second PathKey are returned to the PCE_P as the $j^{th}$ pair of intra-domain paths corresponding to the $j^{th}$ pair of candidate separation domain sequences; herein the intra-domain working path Pin(og, 1, j) and intra-domain protection path Pin(dj, 1, j) are used as intra-domain paths in the head domain AS(1).

Figure 3B:
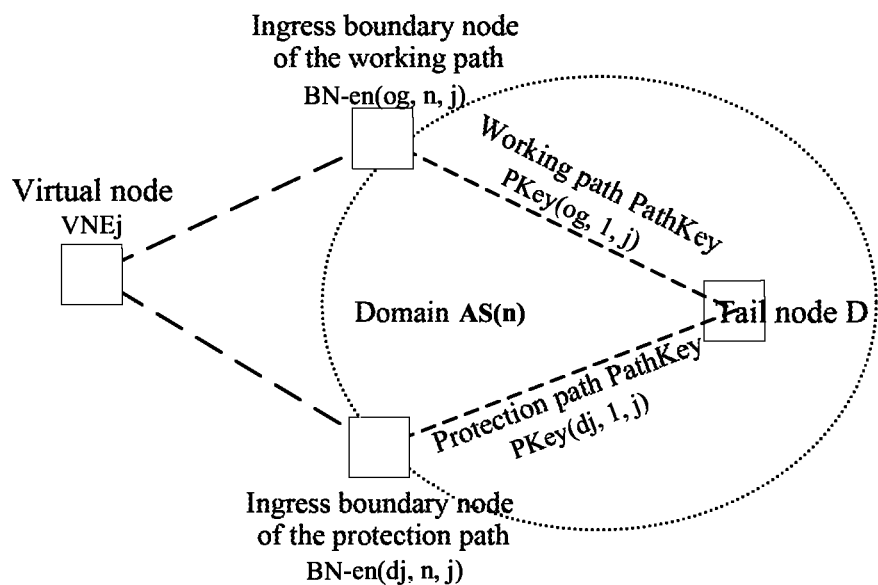
FIG. 3(b) is a topological diagram of a tail domain according to an embodiment of the present disclosure.

Herein, for a sub-PCE, such as PCE_S(n), which is responsible for computing the tail domain AS(n), a type of an intra-domain path computation request received by the PCE_S(n) itself is an association request, and for the association request, disjoint working path and protection path corresponding to the working path(intra-domain paths) in the tail domain are computed for each association request according to an ingress boundary node of the tail domain carried in the association request using the simultaneous disjoint path algorithm. Specifically, in the tail domain AS(n), for the $j^{th}$ associated path computation request(<BN-en(og, n, j), D>, <S, BN-en(dj, n, j), D>), as shown in FIG. 3(b), a virtual node VNEj is newly added in an intra-domain topology of the tail domain AS(n) as a head node of the domain AS(n). As a result, two newly added virtual links appear, herein a first newly added virtual link connects the virtual node VENj and BN-en(og, n, j), and a second newly added virtual link connects the virtual node VENj and BN-en(dj, n, j). A link cost is preset to a certain positive integer which is much less than a minimum intra-domain link cost value. An intra-domain path computation topology of the tail domain is formed according to the virtual node VNEj and the two newly added virtual links. The intra-domain path computation topology of the tail domain includes the two newly added virtual links, the virtual node, and the intra-domain topology of the tail domain.

In the intra-domain path computation topology of the tail domain, a pair of shortest disjoint paths Pin'(og, n, j) and Pin'(dj, n, j) from the virtual node VNEj to the tail node D is computed using the simultaneous disjoint path algorithm, and a path Pin(og, n, j) from an ingress boundary node BN-en(og, n, j) of the tail domain AS(n) (a first ingress boundary node of the tail domain) to the tail node D is separated therefrom, herein Pin(og, n, j) is an intra-domain working path in the tail domain AS(n), and PKey(og, n, j) is generated as a first PathKey; a path Pin(dj, n, j) from the an ingress boundary node BN-en(dj, n, j) of the tail domain AS(n) (a second ingress boundary node of the tail domain) to the tail node D is separated from Pin'(dj, n, j), herein path Pin(dj, n, j) is an intra-domain protection path in the tail domain AS(n), and PKey(dj, n, j) is generated as a second PathKey; and the first PathKey and the second PathKey are returned to the PCE_P as the $j^{th}$ pair of intra-domain paths corresponding to the $j^{th}$ pair of candidate separation domain sequences; herein the intra-domain working path Pin(og, n, j) and intra-domain protection path Pin(dj, n, j) are used as intra-domain paths in the tail domain AS(n).

Herein, for a sub-PCE such as PCE_S(ii), which is responsible for computing the intermediate domain AS(ii), where 1<ii<n, a type of the intra-domain path computation request received by the PCE_S(ii) itself may be an association request type or a non-association request type; for the association request, disjoint working path and protection path corresponding to the working path (intra-domain paths) in the domain AS(ii) are computed for each association request according to boundary nodes which ingress and egress the domain AS(ii) carried in the association request using the simultaneous disjoint path algorithm; and for the non-associated paths, a single intra-domain path in the AS(ii) is computed according to the boundary nodes which ingress and egress the domain carried in the non-association request using the shortest path algorithm and/or the K-optimal path algorithm.

Figure 3C:
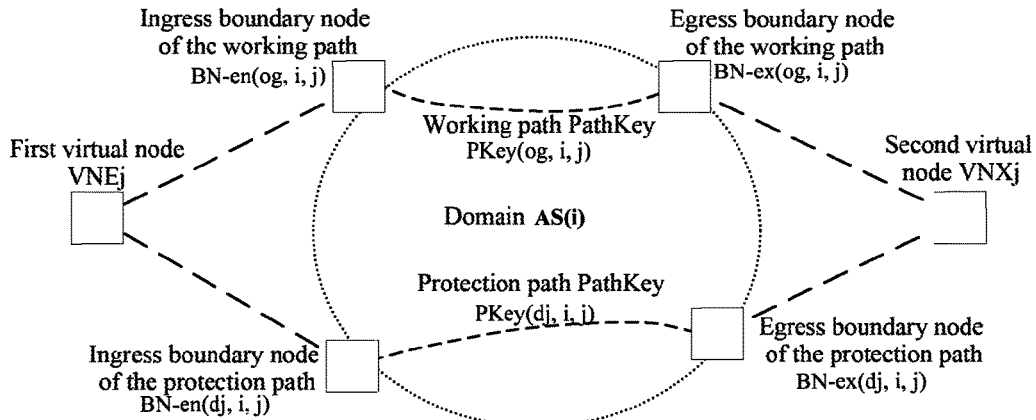
FIG. 3(c) is a topological diagram of an intermediate domain according to an embodiment of the present disclosure.

Specifically, the PCE_S(ii) traverses all the intra-domain path computation requests for the AS(ii) domain, and for the associated path computation request (<BN-en(og, ii, j), BN-ex(og, j)>, <BN-en(dj, ii, j), BN-ex(dj, ii, j)>), as shown in FIG. 3(c), two virtual nodes are newly added to the intra-domain topology of AS(i), which are a first virtual node VNEj and a second virtual node VNXj respectively. Herein, the first virtual node VNEj acts as a head node in the AS(ii) domain and the second virtual node VNXj acts as a tail node in the AS(ii) domain. As a result, four newly added virtual links appear, herein a first newly added virtual link connects VNEj and BN-en(og, ii, j), a second newly added virtual link connects VNEj and BN-en(dj, j), a third newly added virtual link connects BN-ex(og, ii, j) and VNXj, and a fourth newly added virtual link connects BN-ex(dj, ii, j) and VNXj. A link cost is preset to be a certain positive integer value which is much less than a minimum intra-domain link cost value. An intra-domain path computation topology of the intermediate domain is formed according to the first virtual node VNEj, the second virtual node VNXj, and the four newly added virtual links. The intra-domain path computation topology of the intermediate domain includes the four newly added virtual links, the first virtual node VNEj, the second virtual node VNXj and the intra-domain topology of the intermediate domain.

In the intra-domain path computation topology of the intermediate domain AS(ii), a pair of shortest disjoint paths Pin'(og, ii, j) and Pin'(dj, ii, j) from the first virtual node VNEj to the second virtual node VNXj is computed using the simultaneous disjoint path algorithm, and a path Pin(og, ii, j) from an ingress boundary node BN-en(og, ii, j) (a first ingress boundary node of the intermediate domain) to an egress boundary node BN-ex(og, ii, j) (a first egress boundary node of the intermediate domain) of the working path domain sequence in the $j^{th}$ pair of candidate separation domain sequences in the domain AS(ii) is separated from the pair of shortest disjoint paths as the intra-domain working path, and a first PathKey is generated, i.e., PKey(og, ii, j); a path from an ingress boundary node BN-en(dj, ii, j) (a second ingress boundary node of the intermediate domain) to an egress boundary node BN-ex(dj, ii, j) (a second egress boundary node of the intermediate domain) of the protection path domain sequence in the $j^{th}$ pair of candidate separation domain sequences in the domain AS(ii) is separated from the pair of shortest disjoint paths, herein BN-ex(dj, ii, j) is the intra-domain protection path, and a second PathKey is generated, i.e., PKey(og, ii, j); and the first PathKey and the second PathKey are returned to the PCE_P as the $j^{th}$ pair of intra-domain paths corresponding to the $j^{th}$ pair of candidate separation domain sequences; herein the intra-domain working path Pin(og, ii, j) and intra-domain protection path Pin(dj, ii, j) may be used as intra-domain paths in the intermediate domain AS(ii).

Here, the PCE_S(ii) traverses all the intra-domain path computation requests for the AS(ii) domain, and for an non-associated path computation request, the PCE_S(ii) uses paths between boundary nodes which ingress and egress the domain in the domain AS(ii) carried in the non-association request as intra-domain paths in the domain AS(ii), and returns the intra-domain paths to the PCE_P.

Herein, the simultaneous disjoint path algorithm can be known with reference to the existing related description, and will not be repeated here.

In step 14, when at least one pair of intra-domain paths transmitted by each sub-PCE is received by the parent PCE, the parent PCE configures each intra-domain path in the at least one pair of intra-domain paths to a corresponding position in the K pairs of candidate separation domain sequences, to form K pairs of candidate cross-domain separation paths; determines a pair of cross-domain separation paths from the K pairs of candidate cross-domain separation paths; and transmits the cross-domain separation paths as a computation result of the cross-domain separation path computation request to a sub-PCE which is used to administer a domain to which the node belongs.

Here, after the PCE_P collects return results SUB_RSP (i)s from all the PCE_S(i)s, the PCE_P configures intra-domain paths of pass-through domains corresponding to the working path domain sequence in the $j^{th}$ pair of candidate separation domain sequences to corresponding positions of the working path of the $j^{th}$ pair of candidate separation domain sequences, configures intra-domain paths of pass-through domains corresponding to the protection path domain sequence in the $j^{th}$ pair of candidate separation domain sequences to corresponding positions of the protection path of the $j^{th}$ pair of candidate separation domain sequences, and forms a $j^{th}$ pair of candidate cross-domain separation paths; in the formed K pairs of candidate cross-domain separation paths, a path cost of a working path and a path cost of a protection path in each pair of candidate cross-domain separation paths are computed; and the path cost of the working path and the path cost of the protection path in each pair of candidate cross-domain separation paths are summed to form a path cost sum; candidate cross-domain separation paths with the minimum path cost sum are selected as the cross-domain separation paths; and a cross-domain separation path computation result is transmitted to a corresponding PCE_S(i).

In an embodiment, as in the step 121 described above, a specific path of the domain sequence DS(og, j) in the $j^{th}$ pair of candidate separation domain sequences is (S, BN-en(og, 1, j), BN-ex(og, i, j), BN-en(og, i, j), . . . , BN-en(og, n, j), D) and a specific path of DS(dj, j) corresponding to the DS(og, j) is (S, BN-ex(dj, 1, j), BN-en(dj, i, j), BN-ex(dj, i, j), . . . , BN-en(dj, n, j), D), the $j^{th}$ pair of intra-domain paths is configured to corresponding positions in the $j^{th}$ pair of candidate separation domain sequences, to form the $j^{th}$ pair of candidate cross-domain separation paths, for example, the working path DP(og, j) in the $j^{th}$ pair of candidate cross-domain separation paths is (S, PKey(og, 1, j), BN-ex(og, 1, j), . . . , BN-en(og, i, j), PKey(og, j), BN-ex(og, i, j), . . . , BN-en(og, n, j), PKey(og, n, j), D), and the protection path DP(dj, j) in the $j^{th}$ pair of candidate cross-domain separation paths is (S, PKey(dj, 1, j), BN-ex(dj, 1, j), . . . , BN-en(dj, i, j), PKey(dj, i, j), BN-ex(dj, i, j), . . . , BN-en(dj, n, j), PKey(dj, n, j), D); herein, a cost sum of the working path DP(og, j) is PM(og, j), and a cost sum corresponding to the protection path DP(dj, j) is PM(dj, j), the PCE_P selects a pair with the minimum cost sum, i.e., min(PM(og, j)+PM(dj, j)), and assuming that a value of j is jmin at this time, candidate cross-domain separation paths corresponding to DP(og, jmin) and DP(dj, jmin) are obtained, and are used as a computation result for the cross-domain separation path computation request, and the computation result is returned to a sub-PCE, such as PCE_S(1), which is used to forward the cross-domain separation path computation request.

In step 15, a sub-PCE which is used to administer a domain to which the node belongs receives a cross-domain separation path computation result for the cross-domain separation path computation request, and transmits the cross-domain separation path computation result to the node.

Here, for example the PCE-S(1) returns the cross-domain separation path computation result to the node, such as the head node S, which initiates computation for the cross-domain separation path computation request.

It can be seen that the embodiments of the present disclosure determine a final appropriate cross-domain separation path based on the hierarchical PCE conceptual model through interaction between the parent PCE and various sub-PCEs thereof. As the hierarchical PCE conceptual model is used, there is no need to acquire a cross-domain end-to-end domain sequence between head and tail domains in advance. At the same time, the parent PCE acquires the candidate separation domain sequences, and generate corresponding intra-domain path computation requests for various sub-PCEs according to the candidate separation domain sequences, each sub-PCE acquires at least one pair of intra-domain paths of a domain which is administered by itself according to a type of an intra-domain path computation request of itself, and transmits the acquired intra-domain paths to the parent PCE, and the parent PCE configures the received intra-domain paths to corresponding positions of the candidate separation domain sequences, and determines the final cross-domain separation path from the candidate cross-domain separation paths. The parent PCE integrates the computation results of various sub-PCEs, which improves the success ratio of the acquisition of the cross-domain separation paths (the working path and the protection path), thus ensuring the global optimality of path separation.

Figure 4:
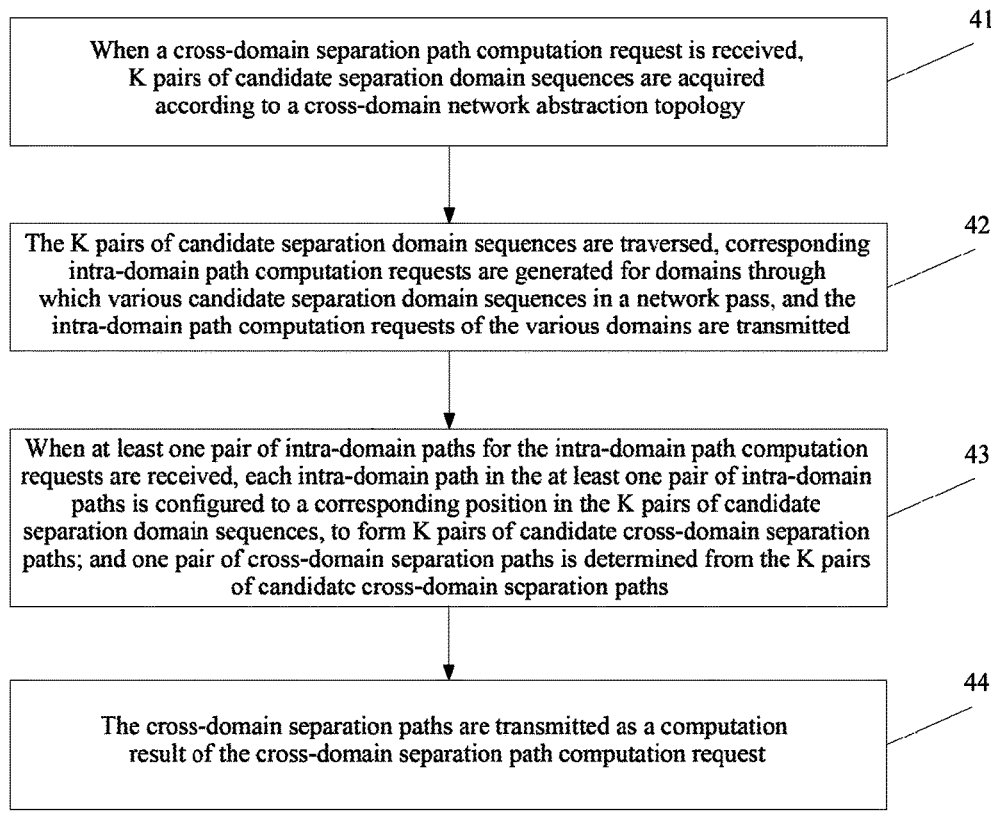
FIG. 4 is a flowchart of implementation two of a method for acquiring a cross-domain separation path according to the present disclosure.

FIG. 4 is a flowchart of implementation two of a method for acquiring a cross-domain separation path according to the present disclosure. The method is applied in a parent PCE. As shown in FIG. 4, the method includes the following steps.

In step 41, when a cross-domain separation path computation request is received, K pairs of candidate separation domain sequences are acquired according to a cross-domain network abstraction topology.

In step 42, the K pairs of candidate separation domain sequences are traversed, corresponding intra-domain path computation requests are generated for domains through which various candidate separation domain sequences in the network pass, and the intra-domain path computation requests of the various domains are transmitted.

In step 43, when at least one pair of intra-domain paths for the intra-domain path computation requests are received, each intra-domain path in the at least one pair of intra-domain paths is configured to a corresponding position in the K pairs of candidate separation domain sequences, to form K pairs of candidate cross-domain separation paths; and one pair of cross-domain separation paths is determined from the K pairs of candidate cross-domain separation paths.

In step 44, the cross-domain separation paths are transmitted as a computation result of the cross-domain separation path computation request.

The embodiments of the present disclosure further provide a first computer storage medium having a first set of computer-executable instructions stored therein, which is used for the above described method for acquiring a cross-domain separation path applied in a parent PCE.

Figure 5:
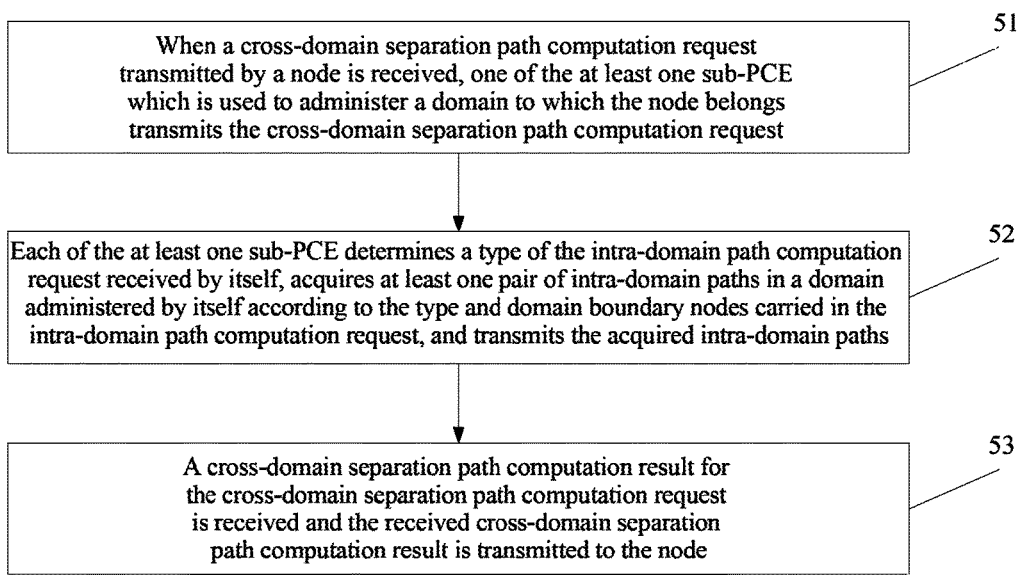
FIG. 5 is a flowchart of implementation three of a method for acquiring a cross-domain separation path according to the present disclosure.

FIG. 5 is a flowchart of implementation three of a method for acquiring a cross-domain separation path according to the present disclosure. The method is applied in at least one sub-PCE. As shown in FIG. 5, the method includes the following steps.

In step 51, when a cross-domain separation path computation request transmitted by a node is received, one of the at least one sub-PCE which is used to administer a domain to which the node belongs transmits the cross-domain separation path computation request.

In step 52, each of the at least one sub-PCE determines a type of the intra-domain path computation request received by itself, acquires at least one pair of intra-domain paths in a domain administered by itself according to the type and domain boundary nodes carried in the intra-domain path computation request, and transmits the acquired intra-domain paths.

In step 53, a cross-domain separation path computation result for the cross-domain separation path computation request is received and the received cross-domain separation path computation result is transmitted to the node.

The embodiments of the present disclosure further provide a second computer storage medium having a second set of computer-executable instructions stored therein, which is used for the above described method for acquiring a cross-domain separation path applied in a sub-PCE.

It should be illustrated that the above-described specific implementations of the method for acquiring a cross-domain separation path applied in at least one sub-PCE and the method for acquiring a cross-domain separation path applied in a parent PCE etc. can be known with reference to the above description of FIGS. 1 to 3, and will not be repeated here.

The above technical solutions can be understood with reference to the following embodiments (embodiment one, embodiment two and embodiment three) according to the present disclosure.

Figure 6:
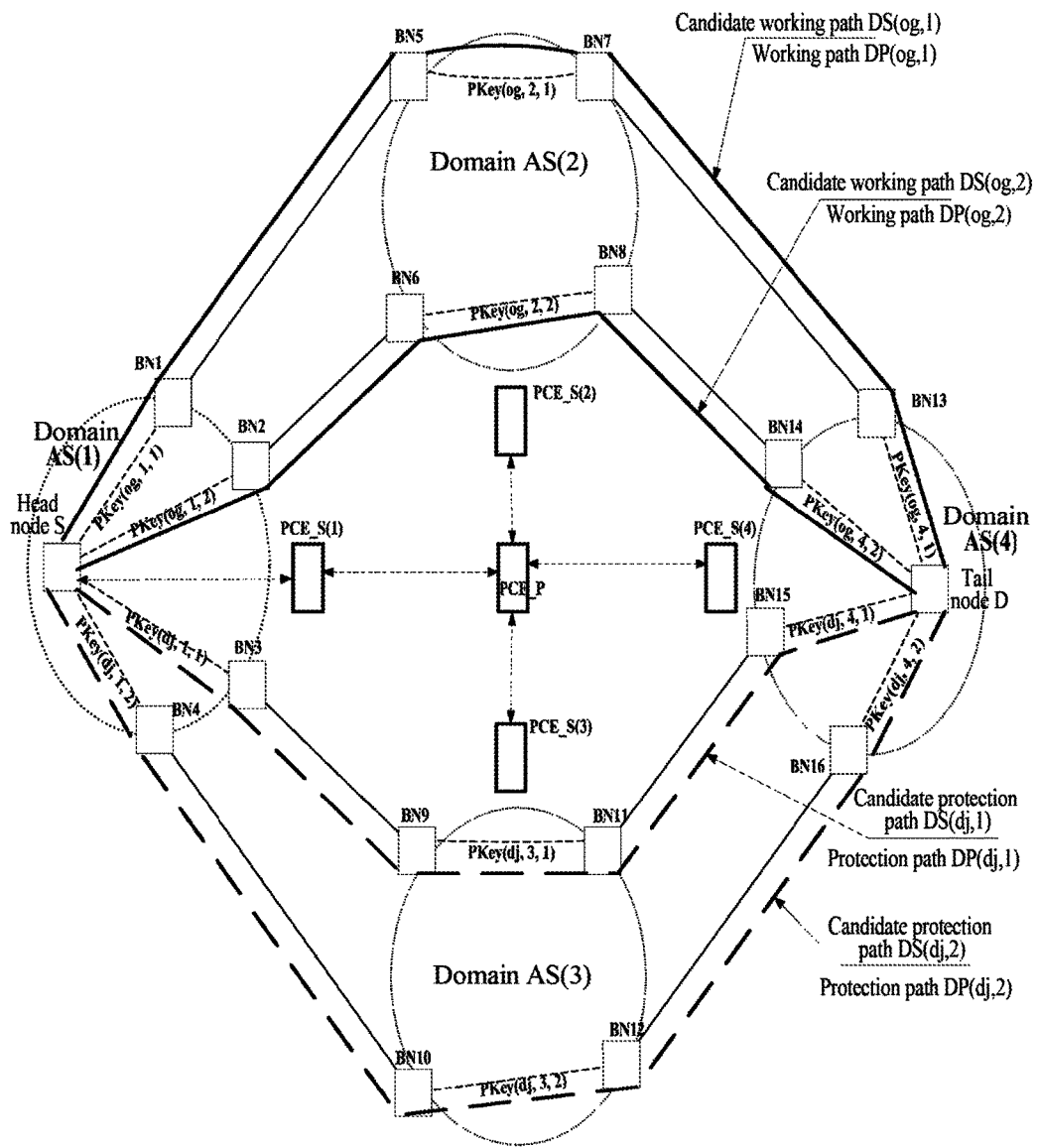
FIG. 6 is a diagram of embodiment one of a method for acquiring a cross-domain separation path according to the present disclosure.

FIG. 6 is a diagram of embodiment one of a method for acquiring a cross-domain separation path according to the present disclosure. The embodiment one belongs to a condition that each of K pairs of candidate separation domain sequences does not have an association request in the intermediate domain AS(ii).

As shown in FIG. 6, in a current network, there are 16 boundary nodes and there are totally n=4 domains, which are AS(1), AS(2), AS(3) and AS(4) respectively. A distribution of the 16 boundary nodes in the 4 domains is shown in the figure. Each domain has a corresponding sub-PCE, and they are PCE_S(1), PCE_S(2), PCE_S(3), and PCE_S(4), respectively. In the current network, there is a parent PCE, i.e., PCE_P, which is used to manage the four sub-PCEs. Herein, a node S is a head node for the cross-domain separation path computation, and is located in the head domain AS(1), and a node D is a destination node (tail node) for the cross-domain separation path computation, and is located in the tail domain AS(4).

In step 601, the head node S sends a cross-domain separation path computation request DPC_REQ(S, D) to the PCE_S(1).

In step 602, the PCE_S(1) transmits the cross-domain separation path computation request to the PCE_P.

In step 603, the PCE_P receives the cross-domain separation path computation request, and firstly computes K pairs of candidate separation domain sequences using the sequential path computation according to an inter-domain topology consisted of ingress and egress boundary nodes and inter-domain links of various domains, herein paths through which the K pairs of candidate separation domain sequences pass are K pairs of candidate cross-domain separation paths.

Here, K is preset to be 2, j is initialized to be 1, and the PCE_P computes a pass-through domain sequence DS(o, j=1) of a working path in a j=$1^{st}$ pair of candidate cross-domain separation paths from a head node S to a tail node D, herein a specific path of the domain sequence DS(o, j=1) is a boundary node sequence (S, BN1, BN5, BN7, BN13, D) illustrated in FIG. 6; and the PCE_P computes a domain sequence DS(dj, j=1) of a protection path in the j=$1^{st}$ pair of candidate cross-domain separation paths from a head node S to a tail node D using the paths of the DS(og, 1) as a separation constraint condition using the shortest path algorithm, herein a specific path of the domain sequence DS(dj, j=1) is a boundary node sequence (S, BN3, BN9, BN11, BN15, D) illustrated in FIG. 6.

Then, PCE_P adds 1 to j (j+1=1+1=2), and judges that j+1 is equal to 2; computes a working path DS domain sequence (og, 2) which is sub-optimal relative to a working path domain sequence DS(og, 1) using the K-optimal path algorithm, and uses the DS(og, 2) as a domain sequence of a working path in a second pair of separation paths, herein a specific path of the domain sequence DS(og, 2) is a boundary node sequence (S, BN2, BN6, BN8, BN14, D) illustrated in FIG. 6; and the PCE_P computes a domain sequence DS(dj, 2) of a protection path in a j=$2^{nd}$ pair of separation paths from S to D using the shortest path algorithm by taking paths of DS(og, 2) as a separation constraint condition, herein a specific path of the domain sequence DS(dj, 2) is a boundary node sequence (S, BN4, BN10, BN12, BN16, D) illustrated in FIG. 6, and the PCE_P adds 1 to j (j+1=2+1=3), and judges that j+1 is greater than K=2, and the process ends.

At this point, the PCE_P totally computes 2 pairs of candidate separation domain sequences, each pair of candidate separation domain sequences corresponding to a candidate cross-domain separation path. As shown in FIG. 6, the black bold solid line in the figure is the work path in the candidate cross-domain separation paths, the black bold dotted line is the protection path in the candidate cross-domain separation paths, and the thin dotted line represents the intra-domain paths.

In step 604, the PCE_P traverses the 2 pairs of candidate separation domain sequences, generates corresponding intra-domain path computation requests for the 4 domains in the current network, and transmits the intra-domain path computation requests for the 4 domains to corresponding sub-PCEs.

Here, for the head domain AS(1), an association computation request (association request) REQ_ID1-1 is generated, which is <S-BN1, S-BN3> for the j=$1^{st}$ pair of candidate separation domain sequences, and an association computation request REQ_ID1-2 is generated, which is <S-BN2, S-BN4> for the j=$2^{nd}$ pair of candidate separation domain sequences, and therefore, two association computation requests are included in the intra-domain path computation request SUB_REQ(1) transmitted to the sub-PCE, i.e., PCE_S(1).

For the tail domain AS(4), an association computation request REQ_ID4-1 is generated, which is <BN13-D, BN15-D> for the j=$1^{st}$ pair of candidate separation domain sequences, and an association computation request REQ_ID4-2 is generated, which is <BN14-D, BN16-D> for the j=$2^{nd}$ pair of candidate separation domain sequences, and therefore, two association computation requests are included in the intra-domain path computation request SUB_REQ(4) transmitted to the sub-PCE, i.e., PCE_S(4).

For an intermediate domain AS(ii=2), a non-association computation request (non-association request), i.e., an independent request REQ_ID2-1 is generated, which is <BN5-BN7> for the j=$1^{st}$ pair of candidate separation domain sequences, and an independent request REQ_ID2-2 is generated, which is <BN6-BN8> for the j=$2^{nd}$ pair of candidate separation domain sequences, and therefore, two independent requests are included in the intra-domain path computation request SUB_REQ(2) transmitted to the sub-PCE, i.e., PCE_S(2).

For an intermediate domain AS(ii=3), a non-association computation request (non-association request), i.e., an independent request R REQ_ID3-1 is generated, which is <BN9-BN11> for the j=$1^{st}$ pair of candidate separation domain sequences, and an independent request REQ_ID3-2 is generated, which is <BN10-BN12> for the j=$2^{nd}$ pair of candidate separation domain sequences, and therefore, two independent requests are included in the intra-domain path computation request SUB_REQ(3) transmitted to the sub-PCE, i.e., PCE_S(3).

In step 605, each sub-PCE determines a type of the intra-domain path computation request received by itself, acquires at least one pair of intra-domain paths of a domain administered by itself according to the type and domain boundary nodes carried in the intra-domain path computation request, and transmits the acquired at least one pair of intra-domain paths to the parent PCE.

Here, two association requests REQ_ID1-1 and REQ_ID1-2 are included in the intra-domain path computation request SUB_REQ(1) received by the sub-PCE responsible for intra-domain path computation of the head domain AS(1), i.e., the PCE_S(1). For a condition that REQ_ID1-1 is <S-BN1, S-BN3>, with reference to the description of FIG. 3(*a*), in the intra-domain topology in the head domain AS(1), a virtual node VNXj is newly added as a tail node in the AS(1) domain. As a result, two newly added virtual links appear, herein the first newly added virtual link connects BN1 and VNXj(j=1), and the second newly added virtual link connects BN3 and VNXj(j=1). In the intra-domain path computation topology of the head domain in which the two newly added virtual links, the virtual node VNXj and the intra-domain topology of the head domain are included, a pair of shortest disjoint paths Pin'(og, 1, j=1) and Pin'(dj, 1, j=1) from the head node S to the virtual node VNXj(j=1) is computed using the simultaneous disjoint path algorithm, a path Pin(og, 1, 1) (which is an intra-domain working path) from the head node S to an egress boundary node BN1 of the head domain AS(1) is separated therefrom, and PKey(og, 1, 1) is generated as a first PathKey; and a path Pin(dj, 1, 1) (which is an intra-domain protection path) from the head node S to an egress boundary node BN3 of the head domain AS(1) is separated from Pin'(dj, 1, 1), a second PKey(dj, 1, 1) is generated as a PathKey, and the first PKey(og, 1, 1) and the second PKey(dj, 1, 1) are encapsulated into DPC_RSP(1) as a j=$1^{st}$ pair of intra-domain paths corresponding to the j=$1^{st}$ pair of candidate separation domain sequences in the head domain AS(1). For a condition that REQ_ID1-2 is <S-BN2, S-BN4>, similarly, the first PKey(og, 1, 2) and the second PKey(1, 2) are separated from the pair of shortest disjoint paths using the above method of adding a virtual node, to acquire PKey(og, 1, 2) and PKey (dj, 1, 2) of a j=$2^{nd}$ pair of intra-domain paths corresponding to a j=$2^{nd}$ pair of candidate separation domain sequences in the head domain AS(1), PKey(og, 1, 2) and PKey(dj, 1, 2) are encapsulated into DPC_RSP(1), and the DPC_RSP(1) is returned to the PCE_P.

Two association requests REQ_ID4-1 and REQ_ID4-2 are included in the intra-domain path computation request SUB_REQ(4) received by the sub-PCE responsible for intra-domain path computation of the tail domain AS(4), i.e., the PCE_S(4). For a condition that REQ_ID4-1 is <BN13-D, BN15-D>, with reference to the description of FIG. 3(*b*), in the intra-domain topology in the tail domain AS(4), a virtual node VNEj is newly added as a head node in the AS(4) domain. As a result, two newly added virtual links appear, herein the first newly added virtual link connects VNEj and BN13, and the second newly added virtual link connects VNEj and BN15. In the intra-domain path computation topology of the tail domain in which the two newly added virtual links, the virtual node VNEj and the intra-domain topology of the tail domain are included, a pair of shortest disjoint paths Pin'(og, 4, j=1) and Pin'(dj, 4, j=1) from the virtual node VNEj to the tail node D is computed using the simultaneous disjoint path algorithm, a path Pin (og, 4, 1) (which is an intra-domain working path) from the node BN13 to the tail node D is separated from Pin'(og, 4, j=1), and PKey(og, 4, 1) is generated as a first PathKey; and a path Pin(dj, 4, 1) from the node BN15 to the tail node D is separated from Pin'(dj, 4, 1), PKey(dj, 4, 1) is generated as a second PathKey, and the PKey(og, 4, 1) and the PKey(dj, 4, 1) are encapsulated into DPC_RSP(4) as a j=$1^{st}$ pair of intra-domain paths corresponding to the j=$1^{st}$ pair of candidate separation domain sequences in the tail domain AS(4). For a condition that REQ_ID4-2 is <BN14-D, BN16-D>, similarly, the intra-domain working path Pin(og, 4, 2) and the intra-domain protection path Pin(dj, 4, 2) are separated from the pair of shortest disjoint paths using the above method of adding a virtual node, PKey(og, 4, 2) is generated as the first PathKey and PKey(dj, 4, 2) is generated as the second PathKey, and PKey(og, 4, 2) and PKey(dj, 4, 2) of a j=$2^{nd}$ pair of intra-domain paths corresponding to a j=$2^{nd}$ pair of candidate separation domain sequences acquired in the tail domain AS(4) are encapsulated into DPC_RSP(4), and the DPC_RSP(4) is returned to the PCE_P.

The intra-domain path computation requests received by the sub-PCE responsible for the intra-domain path computation of the intermediate domain AS(2), i.e., the PCE_S(2), are two independent requests, including REQ_ID2-1 which is <BN5-BN7> and REQ_ID2-2 which is <BN6-BN8>. Herein, for the <BN5-BN7>, the intra-domain paths of the boundary nodes BN5 to BN7 are computed using the shortest path algorithm to acquire the intra-domain paths of the boundary nodes BN5 to BN7 as Pin(og, 2, 1), and PKey(og, 2, 1) is generated as the corresponding PathKey and is encapsulated in SUB_RSP(2). For the <BN6-BN8>, the intra-domain paths of boundary nodes BN6 to BN8 are acquired using the same method as Pin(og, 2, 2), PKey(og, 2, 2) is generated as the corresponding PathKey and is encapsulated into SUB_RSP(2), and the SUB_RSP(2) is returned to the PCE_P.

The intra-domain path computation requests received by the sub-PCE responsible for the intra-domain path computation of the intermediate domain AS(3), i.e., the PCE_S(3), are two independent requests, including REQ_ID2-1 which is <BN9-BN11> and REQ_ID2-2 which is <BN10-BN12>. Herein, for the <BN9-BN11>, the intra-domain paths of the boundary nodes BN9 to BN11 are computed using the shortest path algorithm to acquire the intra-domain paths of the boundary nodes BN9 to BN11 as Pin(og, 3, 1), and PKey(og, 3, 1) is generated as the corresponding PathKey and is encapsulated in SUB_RSP(3). For the <BN10-BN12>, the intra-domain paths of boundary nodes BN10 to BN12 are acquired using the same method as Pin(og, 3, 2), PKey(og, 3, 2) is generated as the corresponding PathKey and is encapsulated into SUB_RSP(3), and the SUB_RSP(3) is returned to the PCE_P.

In step 606, the PCE_P receives the SUB_RSPs(1)-(4) transmitted by the sub-PCEs(1)-(4), and configures each intra-domain path of the at least one pair of intra-domain paths to corresponding positions in the K=2 pairs of candidate separation domain sequences to form K pairs of candidate cross-domain separation paths; determines a pair of cross-domain separation paths from the K=2 pairs of candidate cross-domain separation paths; and transmits the cross-domain separation paths to the sub-PCE which is used for the head node S, i.e., the PCE_S(1), as a computation result for the cross-domain separation path computation request, and the PCE_S(1) then transmits the computation result to the head node S.

Here, the intra-domain PathKey is configured to the corresponding position in a $K^{th}$ pair of candidate separation domain sequences to form K=2 pairs of candidate cross-domain separation paths; herein a working path DP(og, 1) in the first pair of candidate cross-domain separation paths is (S, PKey(og, 1, 1), BN1, BN5, PKey(og, 2, 1), BN7, BN13, PKey(og, 4, 1), D); a protection path DP(dj, 1) in the first pair of candidate cross-domain separation paths is (S, PKey (dj, 1, 1), BN3, BN9, PKey(dj, 3, 1), BN11, BN15, PKey(dj, 4, 1), D); a working path DP(og, 2) in the second pair of candidate cross-domain separation paths is (S, PKey(og, 1, 2), BN2, BN6, PKey(og, 2, 2), BN8, BN14, PKey(og, 4, 2), D); and a protection path DP(dj, 2) in the second pair of candidate cross-domain separation paths is (S, PKey(dj, 1, 2), BN4, BN10, PKey(dj, 3, 2), BN12, BN16, PKey(dj, 4, 2), D).

The PCE_P sums path costs of the two pairs of candidate cross-domain separation paths respectively, and takes a pair with the minimum cost sum. If PM(og, j)+PM(dj, j)(j=2) is a minimum cost sum, i.e., the PCE_P determines that the second pair of candidate cross-domain separation paths DP(og, 2) and DP(dj, 2) from the two pairs of candidate cross-domain separation paths as a final cross-domain separation path computation result, encapsulates the computation result in DPC_RSP(S, D), and transmits the DPC_RSP(S, D) to the PCE_S(1). The PCE_S(1) returns the DPC_RSP(S, D) in which the final cross-domain separation path computation result is encapsulated to the head node S which initiates the cross-domain separation path computation request.

It can be seen that the embodiments of the present disclosure determine a final appropriate cross-domain separation path based on the hierarchical PCE conceptual model through interaction between the parent PCE and various sub-PCEs thereof, which improves the success ratio of the acquisition of the cross-domain separation paths, thus ensuring the global optimality of path separation. Due to the use of the hierarchical PCE conceptual model, a cross-domain end-to-end domain sequence between a head domain and a tail domain needs not to be known in advance.

Figure 7:
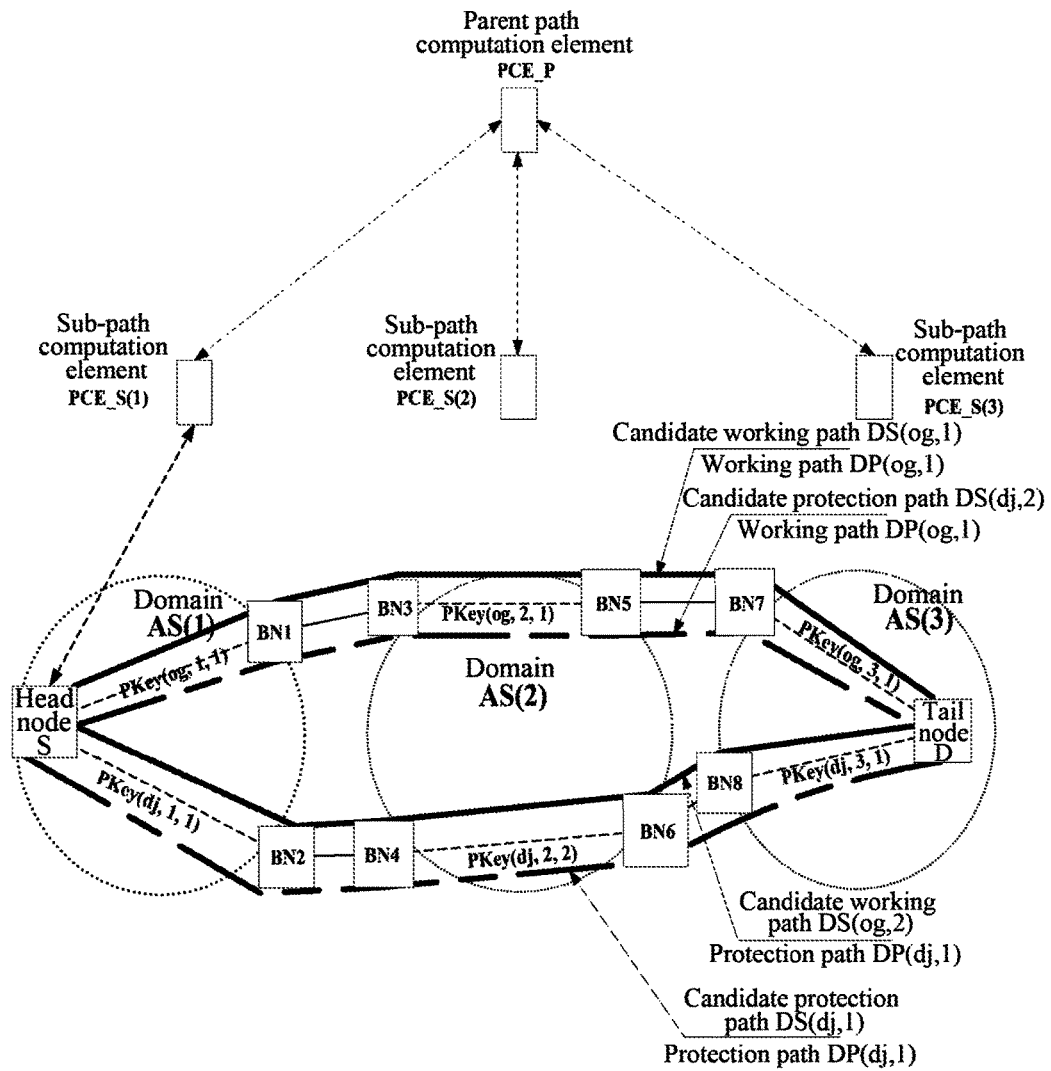
FIG. 7 is a diagram of embodiment two of a method for acquiring a cross-domain separation path according to the present disclosure.

FIG. 7 is a diagram of embodiment two of a method for acquiring a cross-domain separation path according to the present disclosure. The embodiment two belongs to a condition that an intra-domain path computation request of each of K pairs of candidate separation domain sequences in the intermediate domain AS(ii) is an association computation request.

As shown in FIG. 7, in a current network, there are 8 boundary nodes and there are totally n=3 domains, which are AS(1), AS(2) and AS(3) respectively. A distribution of the 8 boundary nodes in the 3 domains is shown in the figure. Various domains correspond to respective sub-PCEs, which are PCE_S(1), PCE_S(2), and PCE_S(3), respectively. In the current network, there is a parent PCE, i.e., PCE_P, which is used to manage the three sub-PCEs. Herein, a node S is a head node for the cross-domain path computation, and is located in the head domain AS(1), and a node D is a destination node (tail node) for the cross-domain path computation, and is located in the tail domain AS(3).

In step 701, the head node S sends a cross-domain separation path computation request DPC_REQ(S, D) to the PCE_S(1).

In step 702, the PCE_S(1) transmits the cross-domain separation path computation request to the PCE_P.

In step 703, the PCE_P receives the cross-domain separation path computation request, and firstly computes K pairs of candidate separation domain sequences using the sequential path computation according to an inter-domain topology consisted of ingress and egress boundary nodes and inter-domain links of various domains, herein paths through which the K pairs of candidate separation domain sequences pass are K pairs of candidate cross-domain separation paths.

Here, K is preset to be 2, j is initialized to be 1, and the PCE_P computes a pass-through domain sequence DS(o, j=1) of a working path in a j=$1^{st}$ pair of candidate cross-domain separation paths from a head node S to a tail node D, herein a specific path of the domain sequence DS(o, j=1) is a boundary node sequence (S, BN1, BN3, BN5, BN7, D) illustrated in FIG. 7; and the PCE_P computes a domain sequence DS(dj, j=1) of a protection path in the j=$1^{st}$ pair of candidate cross-domain separation paths from a head node S to a tail node D using the paths of the DS(og, 1) as a separation constraint condition using the shortest path algorithm, herein a specific path of the domain sequence DS(dj, j=1) is a boundary node sequence (S, BN2, BN4, BN6, BN8, D) illustrated in FIG. 7.

Then, PCE_P adds 1 to j (j+1=1+1=2), and judges that j+1 is equal to 2; computes a working path DS domain sequence (og, 2) which is sub-optimal relative to a working path domain sequence DS(og, 1) using the K-optimal path algorithm, and uses the DS(og, 2) as a domain sequence of a working path in a second pair of separation paths, herein a specific path of the domain sequence DS(og, 2) is a boundary node sequence (S, BN2, BN4, BN6, BN8, D) illustrated in FIG. 7; and the PCE_P computes a domain sequence DS(dj, 2) of a protection path in a j=$2^{nd}$ pair of separation paths from S to D using the shortest path algorithm by taking paths of DS(og, 2) as a separation constraint condition, herein a specific path of the domain sequence DS(dj, 2) is a boundary node sequence (S, BN1, BN3, BN5, BN7, D) illustrated in FIG. 7, and the PCE_P adds 1 to j (j+1=2+1=3), and judges that j+1 is greater than K=2, and the process ends.

At this point, the PCE_P totally computes 2 pairs of candidate separation domain sequences, each pair of candidate separation domain sequences corresponding to a candidate cross-domain separation path. As shown in FIG. 7, the black bold solid line in the figure is the work path in the candidate domain separation paths, the black bold dotted line is the protection path in the candidate cross-domain separation paths, and the thin dotted line represents the intra-domain paths.

In step 704, the PCE_P traverses the 2 pairs of candidate separation domain sequences, generates corresponding intra-domain path computation requests for the 3 domains in the current network, and transmits the intra-domain path computation requests for the 3 domains to corresponding sub-PCEs.

In the present embodiment, the particularity of the network topology enables the working path domain sequence DS(og, 1) in the first pair of candidate separation domain sequences to coincide with the protection path domain sequence DS(dj, 2) in the second pair of candidate separation domain sequences, and the working path domain sequence DS(og, 2) in the second pair of candidate separation domain sequences to coincide with the protection path domain sequence DS(dj, 1) in the first pair of candidate separation domain sequences.

In the head domain AS(1), an association computation request (association request) REQ_ID1-1 generated for the j=$1^{st}$ pair of candidate separation domain sequences and an association request REQ_ID1-2 generated for the j=$2^{nd}$ pair of candidate separation domain sequences are merged, and only one association request REQ_ID1-1 is included in the intra-domain path computation request SUB_REQ(1) transmitted to the sub-PCE, i.e., PCE_S(1), which is <S-BN1, S-BN2>.

In the tail domain AS(3), an association computation request (association request) REQ_ID3-1 generated for the j=$1^{st}$ pair of candidate separation domain sequences and an association request REQ_ID3-2 generated for the j=$2^{nd}$ pair of candidate separation domain sequences are merged, and only one association request REQ_ID3-1 is included in the intra-domain path computation request SUB_REQ(3) transmitted to the sub-PCE, i.e., PCE_S(3), which is <BN7-D, BN8-D>.

In an intermediate domain AS(2), an association computation request (association request) REQ_ID2-1 generated for the j=$1^{st}$ pair of candidate separation domain sequences and an association request REQ_ID2-2 generated for the j=$2^{nd}$ pair of candidate separation domain sequences are merged, and only one association request REQ_ID2-1 is included in the intra-domain path computation request SUB_ REQ(2) transmitted to the sub-PCE, i.e., PCE_S(2), which is <BN3-BN5, BN4-BN6>.

In step 705, each sub-PCE determines a type of the intra-domain path computation request received by itself, acquires at least one pair of intra-domain paths of a domain administered by itself according to the type and intra-domain boundary nodes carried in the intra-domain path computation request, and transmits the acquired at least one pair of intra-domain paths to the parent PCE.

Here, an association request REQ_ID1-1 is included in the intra-domain path computation request SUB_REQ(1) received by the sub-PCE responsible for intra-domain path computation of the head domain AS(1), i.e., the PCE_S(1). For the association computation request <S-BN1, S-BN2>, with reference to the description of FIG. 3(*a*), in the intra-domain topology in the head domain AS(1), a virtual node VNXj is newly added as a tail node in the AS(1) domain. As a result, two newly added virtual links appear, herein the first newly added virtual link connects BN1 and VNXj, and the second newly added virtual link connects BN2 and VNXj. In the intra-domain path computation topology of the head domain in which the two newly added virtual links, the virtual node VNXj and the intra-domain topology of the head domain are included, a pair of shortest disjoint paths Pin'(og, 1, j=1) and Pin'(dj, 1, j=1) from the head node S to the virtual node VNXj(j=1) is computed using the simultaneous disjoint path algorithm, a path Pin(og, 1, 1) (which is an intra-domain working path) from the head node S to an egress boundary node BN1 of the head domain AS(1) is separated therefrom, and PKey(og, 1, 1) is generated as a first PathKey; and a path Pin(dj, 1, 1) (which is an intra-domain protection path) from the head node S to an egress boundary node BN2 of the head domain AS(1) is separated from Pin'(dj, 1, 1), PKey(dj, 1, 1) is generated as a second PathKey, and the first PathKey and the second PathKey are encapsulated into DPC_RSP(1) as a j=$1^{st}$ pair of intra-domain paths corresponding to the j=$1^{st}$ pair of candidate separation domain sequences in the head domain AS(1). The DPC_RSP(1) is returned to the PCE_P.

Here, an association request REQ_ID3-1 is included in the intra-domain path computation request SUB_REQ(3) received by the sub-PCE responsible for intra-domain path computation of the tail domain AS(3), i.e., the PCE_S(3). For the association request <BN7-D, BN8-D>, with reference to the description of FIG. 3(*b*), in the intra-domain topology in the tail domain AS(3), a virtual node VNEj is newly added as a head node in the AS(3) domain. As a result, two newly added virtual links appear, herein the first newly added virtual link connects the virtual node VNEj(j=1) and BN7, and the second newly added virtual link connects VNEj(j=1) and BN8. In the intra-domain path computation topology of the tail domain in which the two newly added virtual links, the virtual node VNEj and the intra-domain topology are included, a pair of shortest disjoint paths Pin'(og, 3, j=1) and Pin'(dj, 3, j=1) from the virtual node VNEj to the tail node D is computed using the simultaneous disjoint path algorithm, a path Pin(og, 3, 1) (which is an intra-domain working path) from the BN7 to the tail node D is separated therefrom, and PKey(og, 3, 1) is generated as a first PathKey; and a path Pin(dj, 3, 1) (which is an intra-domain protection path) from the node BN8 to the tail node D is separated from Pin'(dj, 3, 1), PKey(dj, 3, 1) is generated as a second PathKey, and the first PathKey and the second PathKey are encapsulated into DPC_RSP(3) as a j=$1^{st}$ pair of intra-domain paths corresponding to the j=$1^{st}$ pair of candidate separation domain sequences in the tail domain AS(3). The DPC_RSP(3) is returned to the PCE_P.

An association request REQ_ID2-1 is included in an intra-domain path computation request SUB_REQ(2) received the sub-PCE responsible for intra-domain path computation of the intermediate domain AS(ii=2), i.e., the PCE_S(2). For the association computation request <BN3-BN5, BN4-BN6>, with reference to the description of FIG. 3(*c*), in the intra-domain topology of the intermediate domain AS(2), a first virtual node VNEj is newly added as the head node of the domain AS(2), and a second virtual node VNXj is newly added as the tail node of the domain AS(2). As a result, four newly added virtual links appear, herein the first newly added virtual link connects the VNEj and BN3, the second newly added virtual link connects the VNEj and BN4, the third newly added virtual link connects the BN5 and VNXj, and the fourth newly added virtual link connects the BN6 and VNXj. In an intra-domain path computation topology of the intermediate domain in which the four newly added virtual links, the first virtual node VNEj, the second virtual node VNXj, and the intra-domain topology of the intermediate domain are included, a pair of shortest disjoint paths Pin'(og, 2, j=1) and Pin'(dj, 2, j=1) from the virtual node VNEj to VNXj is computed using the simultaneous disjoint path algorithm, a path Pin(og, 2, 1) (which is an intra-domain working path) from the BN3 to BN5 is separated therefrom, and PKey(og, 2, 1) is generated as a first PathKey. A path Pin(dj, 2, 1) (which is an intra-domain protection path) from the BN4 to BN6 is separated from Pin'(dj, 2, 1), PKey(dj, 2, 1) is generated as a second PathKey, and the first PathKey and the second PathKey are encapsulated into DPC_RSP(2) as a j=$1^{st}$ pair of intra-domain paths corresponding to the j=$1^{st}$ pair of candidate separation domain sequences in the tail domain AS(2). The DPC_RSP(2) is returned to the PCE_P.

At this point, the AS(1), the AS(2), and the AS(3) respectively acquire intra-domain paths of domains to which they belong and transmit the acquired intra-domain paths to the PCE_P.

In step 706, the PCE_P receives the SUB_RSPs(1)-(3) transmitted by the sub-PCEs(1)-(3), and configures each intra-domain path of the at least one pair of intra-domain paths to corresponding positions in the K=2 pairs of candidate separation domain sequences to form K pairs of candidate cross-domain separation paths; determines final cross-domain separation paths from the K=2 pairs of candidate cross-domain separation paths; and transmits the cross-domain separation paths to the sub-PCE which is used for the head node S, i.e., the PCE_S(1), as a computation result for the cross-domain separation path computation request, and the PCE_S(1) then transmits the computation result to the head node S.

Here, the intra-domain PathKey is configured to the corresponding position in a $K^{th}$ pair of candidate separation domain sequences to form K=2 pairs of candidate cross-domain separation paths; herein a working path DP(og, 1) in the first pair of candidate cross-domain separation paths is (S, PKey(og, 1, 1), BN1, BN5, PKey(og, 2, 1), BN7, BN13, PKey(og, 4, 1), D); a protection path DP(dj, 1) in the first pair of candidate cross-domain separation paths is (S, PKey (dj, 1, 1), BN3, BN9, PKey(dj, 3, 1), BN11, BN15, PKey(dj, 4, 1), D); a working path DP(og, 2) in the second pair of candidate cross-domain separation paths is (S, PKey(og, 1, 2), BN2, BN6, PKey(og, 2, 2), BN8, BN14, PKey(og, 4, 2), D); and a protection path DP(dj, 2) in the second pair of candidate cross-domain separation paths is (S, PKey(dj, 1, 2), BN4, BN10, PKey(dj, 3, 2), BN12, BN16, PKey(dj, 4, 2), D).

The PCE_P sums path costs of the two pairs of candidate cross-domain separation paths respectively, and takes a pair with the minimum cost sum. If PM(og, j)+PM(dj, j)(j=1) is a minimum cost sum, the PCE_P determines the second pair of candidate cross-domain separation paths DP(og, 1) and DP(dj, 1) from the two pairs of candidate cross-domain separation paths as cross-domain separation paths, encapsulates the computation result in DPC_RSP(S, D), and transmits the DPC_RSP(S, D) to the PCE_S(1). The PCE_S (1) returns the DPC_RSP(S, D) in which the final cross-domain separation path computation result is encapsulated to the head node S which initiates the cross-domain separation path computation request.

It can be seen that the embodiments of the present disclosure determine a final appropriate cross-domain separation path based on the hierarchical PCE conceptual model through interaction between the parent PCE and various sub-PCEs thereof, which improves the success ratio of the acquisition of the cross-domain separation paths, thus ensuring the global optimality of path separation. Due to the use of the hierarchical PCE conceptual model, a cross-domain end-to-end domain sequence between a head domain and a tail domain needs not to be known in advance.

Figure 8:
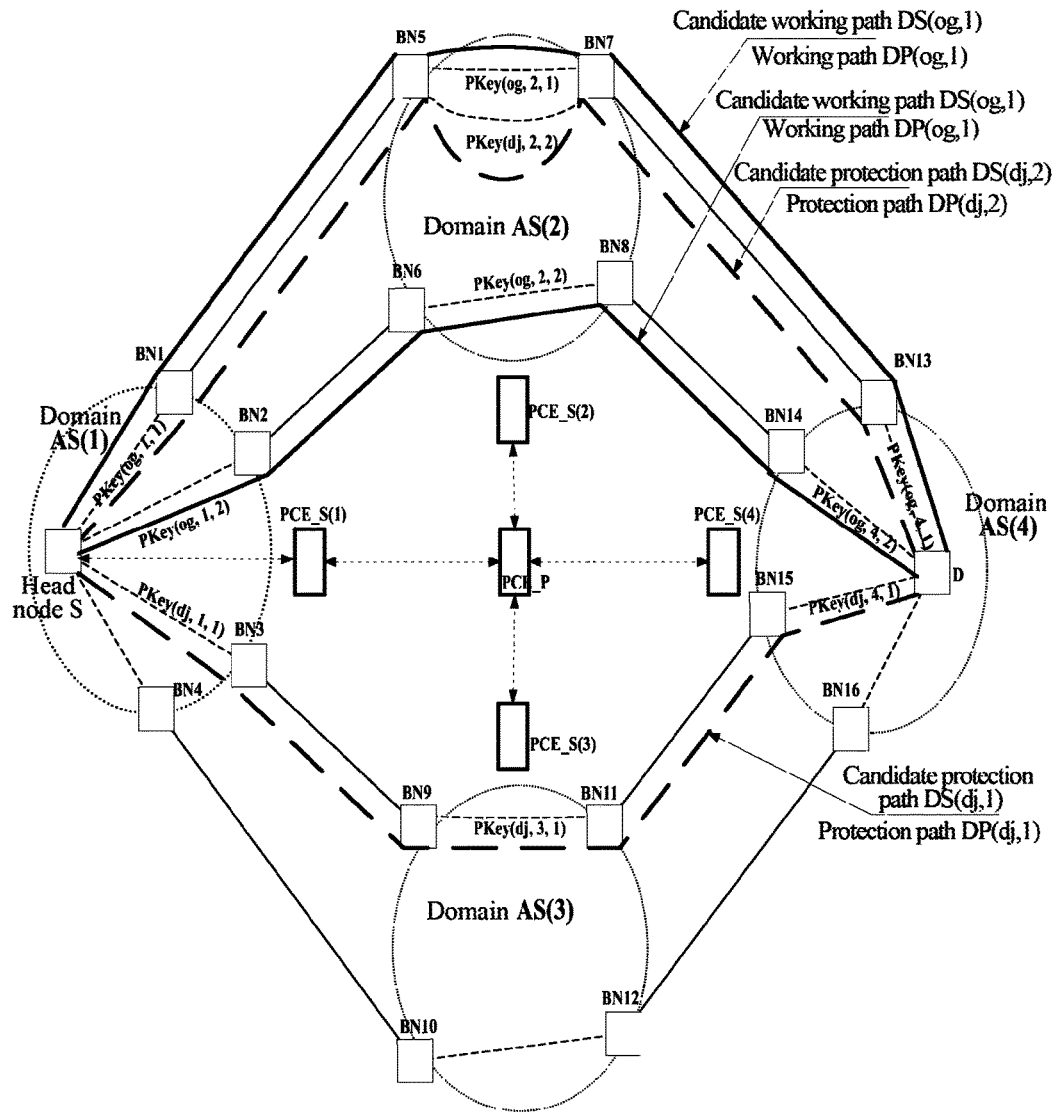
FIG. 8 is a diagram of embodiment three of a method for acquiring a cross-domain separation path according to the present disclosure.

FIG. 8 is a diagram of embodiment three of a method for acquiring a cross-domain separation path according to the present disclosure. The embodiment three belongs to a condition that an intra-domain path computation request of a part of K pairs of candidate separation domain sequences in the intermediate domain AS(ii) is an association computation request.

As shown in FIG. 8, in a current network, there are 16 boundary nodes and there are totally n=4 domains, which are AS(1), AS(2), AS(3) and AS(4) respectively. A distribution of the 16 boundary nodes in the 4 domains is shown in the figure. Various domains correspond to respective sub-PCEs, which are PCE_S(1), PCE_S(2), PCE_S(3), and PCE_S(4), respectively. In the current network, there is a parent PCE, i.e., PCE_P, which is used to manage the four sub-PCEs. Herein, a node S is a head node for the cross-domain path computation, and is located in the head domain AS(1), and a node D is a destination node (tail node) for the cross-domain path computation, and is located in the tail domain AS(4).

In step 801, the head node S sends a cross-domain separation path computation request DPC_REQ(S, D) to the PCE_S(1).

In step 802, the PCE_S(1) transmits the cross-domain separation path computation request to the PCE_P.

In step 803, the PCE_P receives the cross-domain separation path computation request, and firstly computes K pairs of candidate separation domain sequences using the sequential path computation according to an inter-domain topology consisted of ingress and egress boundary nodes and inter-domain links of various domains, herein paths through which the K pairs of candidate separation domain sequences pass are K pairs of candidate cross-domain separation paths.

Here, K is preset to be 2, j is initialized to be 1, and the PCE_P computes a pass-through domain sequence DS(o, j=1) of a working path in a j=$1^{st}$ pair of candidate cross-domain separation paths from a head node S to a tail node D, herein a specific path of the domain sequence DS(o, j=1) is a boundary node sequence (S, BN1, BN5, BN7, BN13, D) illustrated in FIG. 8; and the PCE_P computes a domain sequence DS(dj, j=1) of a protection path in the j=$1^{st}$ pair of candidate cross-domain separation paths from a head node S to a tail node D using the paths of the DS(og, 1) as a separation constraint condition using the shortest path algorithm, herein a specific path of the domain sequence DS(dj, j=1) is a boundary node sequence (S, BN3, BN9, BN11, BN15, D) illustrated in FIG. 8.

Then, PCE_P adds 1 to j (j+1=1+1=2), and judges that j+1 is equal to 2; computes a working path DS domain sequence (og, 2) which is sub-optimal relative to a working path domain sequence DS(og, 1) using the K-optimal path algorithm, and uses the DS(og, 2) as a domain sequence of a working path in a second pair of separation paths, herein a specific path of the domain sequence DS(og, 2) is a boundary node sequence (S, BN2, BN4, BN6, BN8, D) illustrated in FIG. 8; and the PCE_P computes a domain sequence DS(dj, 2) of a protection path in a j=$2^{nd}$ pair of separation paths from S to D using the shortest path algorithm by taking paths of DS(og, 2) as a separation constraint condition, herein a specific path of the domain sequence DS(dj, 2) is a boundary node sequence (S, BN2, BN6, BN8, BN14, D) illustrated in FIG. 8, and the PCE_P adds 1 to j (j+1=2+1=3), and judges that j+1 is greater than K=2, and the process ends.

At this point, the PCE_P totally computes 2 pairs of candidate separation domain sequences, each pair of candidate separation domain sequences corresponding to a candidate cross-domain separation path. As shown in FIG. 8, the black bold solid line in the figure is the work path in the candidate cross-domain separation paths, the black bold dotted line is the protection path in the candidate cross-domain separation paths, and the thin dotted line represents the intra-domain paths.

In step 804, the PCE_P traverses the 2 pairs of candidate separation domain sequences, generates corresponding intra-domain path computation requests for the 4 domains in the current network, and transmits the intra-domain path computation requests for the 4 domains to corresponding sub-PCEs.

In the present embodiment, the particularity of the network topology enables the working path domain sequence DS(og, 1) in the first pair of candidate separation domain sequences to coincide with the protection path domain sequence DS(dj, 2) in the second pair of candidate separation domain sequences.

In the head domain AS(1), an association request REQ_ID1-1 is generated, which is <S-BN1, S-BN3> for the j=$1^{st}$ pair of candidate separation domain sequences, and an association request REQ_ID1-2 is generated, which is <S-BN1, S-BN2> for the j=$2^{nd}$ pair of candidate separation domain sequences, and two association requests REQ_ID1-1 and REQ_ID1-2 are included in the intra-domain path computation request SUB_REQ(1) transmitted to the sub-PCE, i.e., PCE_S(1).

In the tail domain AS(4), an association request REQ_ID4-1 is generated, which is <BN13-D, BN15-D> for the j=$1^{st}$ pair of candidate separation domain sequences, and an association request REQ_ID4-2 is generated, which is <BN14-D, BN13-D> for the j=$2^{nd}$ pair of candidate separation domain sequences, and the above two association requests REQ_ID4-1 and REQ_ID4-2 are included in the intra-domain path computation request SUB_REQ(4) transmitted to the sub-PCE, i.e., PCE_S(4).

In the intermediate domain AS(2), an association request REQ_ID2-1 which is <BN6-BN8, BN5-BN7> is generated for the j=$2^{nd}$ pair of candidate separation domain sequences, since both DS(og, 2) and DS(dj, 2) pass through the intermediate domain AS(2). A non-association request (independent request) REQ_ID2-2 which is <BN5-BN7> is generated for a j=$1^{st}$ pair of candidate separation domain sequences since only DS(og, 1) in the DS(og, 1) and DS(dj, 1) passes through the intermediate domain AS(2). The intra-domain path computation request SUB_REQ(2) transmitted to the sub PCE (i.e., PCE_S(2)) includes the above-mentioned association request REQ_ID2-1 and non-association request REQ_ID2-2.

In the intermediate domain AS(3), there is no association or non-association request generated for the j=$2^{nd}$ pair of candidate separation domain sequences, since none of DS(og, 2) and DS(dj, 2) passes through the intermediate domain AS(3). A non-association request REQ_ID3-1 which is <BN9-BN11> is generated for a j=$1^{st}$ pair of candidate separation domain sequences since only DS(dj, 1) in the DS(og, 1) and DS(dj, 1) passes through the intermediate domain AS(3). The intra-domain path computation request SUB_REQ(3) transmitted to the sub-PCE (i.e., PCE_S(3)) includes the above-mentioned non-association request REQ_ID3-1.

In step 805, each sub-PCE determines a type of the intra-domain path computation request received by itself, acquires at least one pair of intra-domain paths of a domain administered by itself according to the type and domain boundary nodes carried in the intra-domain path computation request, and transmits the acquired at least one pair of intra-domain paths to the parent PCE.

Here, two association requests REQ_ID1-1 and REQ_ID1-2 are included in the intra-domain path computation request SUB_REQ(1) received by the sub-PCE responsible for intra-domain path computation of the head domain AS(1), i.e., the PCE_S(1). Herein, for a condition that REQ_ID1-1 is <S-BN1, S-BN3>, with reference to the description of FIG. 3(*a*), in the intra-domain topology in the head domain AS(1), a virtual node VNXj is newly added as a tail node in the AS(1) domain. As a result, two newly added virtual links appear, herein the first newly added virtual link connects BN1 and VNXj, and the second newly added virtual link connects BN3 and VNXj. In the intra-domain path computation topology of the head domain in which the two newly added virtual links, the virtual node VNXj and the intra-domain topology of the head domain are included, a pair of shortest disjoint paths Pin'(og, 1, j=1) and Pin'(dj, 1, j=1) from the head node S to the virtual node VNXj(j=1) is computed using the simultaneous disjoint path algorithm, a path Pin(og, 1, 1) (which is an intra-domain working path) from the head node S to an egress boundary node BN1 of the head domain AS(1) is separated therefrom, and PKey(og, 1, 1) is generated as a first PathKey; and a path Pin(dj, 1, 1) (which is an intra-domain protection path) from the head node S to an egress boundary node BN3 of the head domain AS(1) is separated from Pin'(dj, 1, 1), PKey(dj, 1, 1) is generated as a second PathKey, and the first PathKey and the second PathKey are encapsulated into DPC_RSP(1) as a j=$1^{st}$ pair of intra-domain paths corresponding to the j=$1^{st}$ pair of candidate separation domain sequences in the head domain AS(1). For a condition that REQ_ID1-2 is <S-BN1, S-BN2>, similarly, the first PathKey and the second PathKey are separated from the pair of shortest disjoint paths using the above method of adding a virtual node, to acquire PKey(og, 1, 2) and PKey(dj, 1, 2) of a j=$2^{nd}$ pair of intra-domain paths corresponding to a j=$2^{nd}$ pair of candidate separation domain sequences in the head domain AS(1), PKey(og, 1, 2) and PKey(dj, 1, 2) are encapsulated into DPC_RSP(1), and the DPC_RSP(1) is returned to the PCE_P.

Two association requests REQ_ID4-1 and REQ_ID4-2 are included in the intra-domain path computation request SUB_REQ(4) received by the sub-PCE responsible for intra-domain path computation of the tail domain AS(4), i.e., the PCE_S(4). For a condition that REQ_ID4-1 is <BN13-D, BN15-D>, with reference to the description of FIG. 3(*b*), in the intra-domain topology in the tail domain AS(4), a virtual node VNEj is newly added as a head node in the AS(4) domain. As a result, two newly added virtual links appear, herein the first newly added virtual link connects VNEj and BN13, and the second newly added virtual link connects VNEj and BN15. In the intra-domain path computation topology of the tail domain in which the two newly added virtual links, the virtual node VNEj and the intra-domain topology of the tail domain are included, a pair of shortest disjoint paths Pin'(og, 4, j=1) and Pin'(dj, 4, j=1) from the virtual node VNEj to the tail node D is computed using the simultaneous disjoint path algorithm, a path Pin (og, 4, 1) (which is an intra-domain working path) from the node BN13 to the tail node D is separated from Pin'(og, 4, j=1), and (og, 4, 1) is generated as a first PathKey; and a path Pin(dj, 4, 1) (which is an intra-domain working path) from the node BN15 to the tail node D is separated from Pin'(dj, 4, 1), PKey(dj, 4, 1) is generated as a second PathKey, and the first PathKey and the second PathKey are encapsulated into DPC_RSP(4) as a j=1$^{st}$ pair of intra-domain paths corresponding to the j=1$^{st}$ pair of candidate separation domain sequences in the tail domain AS(4). For a condition that REQ_ID4-2 is <BN14-D, BN13-D>, similarly, the intra-domain working path and the intra-domain protection path are separated from the pair of shortest disjoint paths using the above method of adding a virtual node, corresponding PathKeys are generated, so as to acquire PKey(og, 4, 2) and PKey(dj, 4, 2) of a j=2$^{nd}$ pair of intra-domain paths corresponding to a j=2$^{nd}$ pair of candidate separation domain sequences acquired in the tail domain AS(4), which are encapsulated into DPC_RSP(4), and the DPC_RSP(4) is returned to the PCE_P.

An association request REQ_ID2-1 and a non-association request REQ_ID2-2 are included in an intra-domain path computation request received by the sub-PCE responsible for computation of intra-domain paths of the intermediate domain AS(2), i.e., the PCE_S(2). For a condition that the association request REQ_ID2-1 is <BN6-BN8, BN5-BN7>, with reference to the description of FIG. 3(c), in the intermediate domain AS(2), a first virtual node VNEj and a second virtual node VNXj(j=2) are added, herein the first virtual node VNEj is used as the head node of the domain AS(2), and the second virtual node VNXj is used as the tail node of the domain AS(2). As a result, four newly added virtual links appear, herein the first newly added virtual link connects the VNEj and BN6, the second newly added virtual link connects the VNEj and BN5, the third newly added virtual link connects the BN8 and VNXj, and the fourth newly added virtual link connects the BN7 and VNXj. In an intra-domain path computation topology of the intermediate domain in which the four newly added virtual links, the first virtual node VNEj, the second virtual node VNXj, and the intra-domain topology of the intermediate domain are included, a pair of shortest disjoint paths Pin'(og, 2, 2) and Pin'(dj, 2, 2) from the first virtual node VNEj to the second virtual node VNXj is computed using the simultaneous disjoint path algorithm, a path Pin(og, 2, 2) from the ingress boundary node BN6 to the egress boundary node BN8 of the working path domain sequence in the j=2$^{nd}$ pair of candidate separation domain sequences in the domain AS(2) is separated from the pair of shortest disjoint paths, and PKey(og, 2, 2) is generated as a first PathKey, and a path from the ingress boundary node BN-en(dj, 2, 2) to the egress boundary node BN-ex(dj, 2, 2) of the protection path domain sequence in the j=2$^{nd}$ pair of candidate separation domain sequences in the domain AS(2) is separated from the pair of shortest disjoint paths, and PKey(og, 2, 2) is generated as a second PathKey, which is encapsulated into DPC_RSP(2). For a condition that the non-association request REQ_ID2-2 is <BN5-BN7>, intra-domain paths from the boundary node BN5 to BN7 are computed using the shortest path algorithm, to acquire the intra-domain paths from the boundary node BN5 to BN7 as Pin(og, 2, 1), and PKey(og, 2, 1) is generated as a corresponding PathKey, which is encapsulated into the SUB_RSP(2). The DPC_RSP(2) is returned to the PCE_P.

The intra-domain path computation request received by the sub-PCE responsible for the intra-domain path computation of the intermediate domain AS(3), i.e., the PCE_S(3), includes a non-association request (independent request) REQ_ID3-1 which is <BN9-BN11>. For the request, the intra-domain paths of the boundary nodes BN9 to BN11 are computed using the shortest path algorithm to acquire the intra-domain paths of the boundary nodes BN9 to BN11 as Pin(og, 3, 1), and PKey(og, 3, 1) is generated as the corresponding PathKey and is encapsulated in SUB_RSP (3). The DPC_RSP(3) is returned to the PCE_P.

In step 806, the PCE_P receives the SUB_RSPs(1)-(4) transmitted by the sub-PCEs(1)-(4), and configures each intra-domain path of the at least one pair of intra-domain paths to corresponding positions in the K=2 pairs of candidate separation domain sequences to form K pairs of candidate cross-domain separation paths; determines cross-domain separation paths from the K=2 pairs of candidate cross-domain separation paths; and transmits the cross-domain separation paths to the sub-PCE which is used for the head node S, i.e., the PCE_S(1), as a computation result for the cross-domain separation path computation request, and the PCE_S(1) then transmits the computation result to the head node S.

Here, the intra-domain PathKey is configured to the corresponding position in a K$^{th}$ pair of candidate separation domain sequences to form K=2 pairs of candidate cross-domain separation paths; herein a working path DP(og, 1) in the first pair of candidate cross-domain separation paths is (S, PKey(og, 1, 1), BN1, BN5, PKey(og, 2, 1), BN7, BN13, PKey(og, 4, 1), D); a protection path DP(dj, 1) in the first pair of candidate cross-domain separation paths is (S, PKey (dj, 1, 1), BN3, BN9, PKey(dj, 3, 1), BN11, BN15, PKey(dj, 4, 1), D); a working path DP(og, 2) in the second pair of candidate cross-domain separation paths is (S, PKey(og, 1, 2), BN2, BN6, PKey(og, 2, 2), BN8, BN14, PKey(og, 4, 2), D); and a protection path DP(dj, 2) in the second pair of candidate cross-domain separation paths is (S, PKey(og, 1, 1), BN4, BN10, PKey(dj, 2, 2), BN12, BN16, PKey(og, 4, 1), D).

The PCE_P sums path costs of the two pairs of candidate cross-domain separation paths respectively, and takes a pair with the minimum cost sum. If PM(og, j)+PM(dj, j)(j=2) is a minimum cost sum, i.e., the PCE_P determines that the second pair of candidate cross-domain separation paths DPS(og, 2) and DP(dj, 2) from the two pairs of candidate cross-domain separation paths as cross-domain separation paths, encapsulates the computation result in DPC_RSP(S, D), and transmits the DPC_RSP(S, D) to the PCE_S(1). The PCE_S(1) returns the DPC_RSP(S, D) in which the final cross-domain separation path computation result is encapsulated to the head node S which initiates the cross-domain separation path computation request.

It can be seen that in the embodiments of the present disclosure, when a cross-domain separation path computation request is received, a parent PCE in a hierarchical PCE conceptual model acquires K pairs of candidate separation domain sequences according to a cross-domain network abstraction topology; traverses the K pairs of candidate separation domain sequences, generates corresponding intra-domain path computation requests for domains through which various candidate separation domain sequences in the network pass, and transmits the intra-domain path computation requests of the various domains to each sub-PCE administered by the parent PCE; each of the at least one sub-PCE determines a type of the intra-domain path computation request received by itself, acquires at least one pair of intra-domain paths administered by itself according to the type and domain boundary nodes carried in the intra-domain path computation request, and transmits the acquired intra-domain paths to the parent PCE; when at least one pair of intra-domain paths is received, the parent PCE configures each intra-domain path of the at least one pair of intra-domain paths to a corresponding position in the K pairs of candidate separation domain sequences, to form K pairs of candidate cross-domain separation paths; determines one pair of cross-domain separation paths from the K pairs of candidate cross-domain separation paths, and transmits the cross-domain separation paths as a computation result of the cross-domain separation path computation requests; herein K is a positive integer. It can be seen that the embodiments of the present disclosure determine a final appropriate cross-domain separation path based on the hierarchical PCE conceptual model through interaction between the parent PCE and various sub-PCEs thereof, and a cross-domain end-to-end domain sequence between a head domain and a tail domain needs not to be known in advance. Further, the success ratio of the acquisition of the cross-domain separation paths (the working path and the protection path) is improved, thus ensuring the global optimality of path separation.

Based on the above method, the embodiments of the present disclosure further provide a path computation element PCE, which may be used as a parent PCE in a hierarchical PCE conceptual model.

Figure 9:
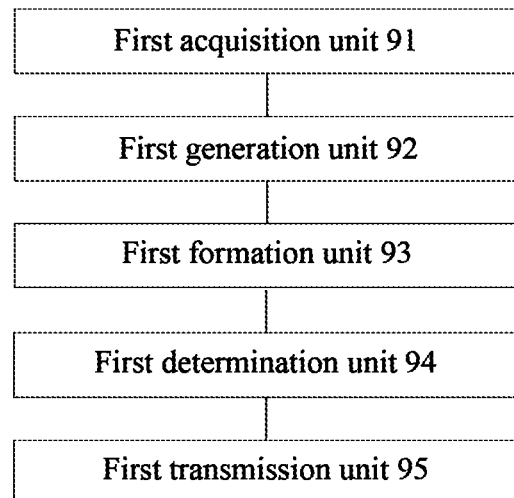
FIG. 9 is a constitutional diagram of embodiment one of a path computation element according to the present disclosure.

FIG. 9 is a diagram of constitution of embodiment one of a path computation element according to an embodiment of the present disclosure. As shown in FIG. 9, the PCE includes:

a first acquisition unit 91 arranged to: when a cross-domain separation path computation request is received, acquire K pairs of candidate separation domain sequences according to a cross-domain network abstraction topology;

a first generation unit 92 arranged to traverse the K pairs of candidate separation domain sequences, generate corresponding intra-domain path computation requests for domains through which various candidate separation domain sequences in the network pass, and transmit the intra-domain path computation requests of the various domains;

a first formation unit 93 arranged to when at least one pair of intra-domain paths for the intra-domain path computation requests are received, configure each intra-domain path of the at least one pair of intra-domain paths to a corresponding position in the K pairs of candidate separation domain sequences, to form K pairs of candidate cross-domain separation paths;

a first determination unit 94 arranged to determine one pair of cross-domain separation paths from the K pairs of candidate cross-domain separation paths, and a first transmission unit 95 arranged to transmit the cross-domain separation paths as a computation result of the cross-domain separation path computation request;

where K is a positive integer.

In an embodiment, the first acquisition unit 91 is arranged to:

initialize K, initialize a positive integer j to be 1, and compute a working path domain sequence in a first pair of candidate separation domain sequences from the K pairs of candidate separation domain sequences from a head node to a tail node of the network using a preset shortest path algorithm according to an inter-domain topology consisted of ingress and egress boundary nodes and inter-domain links of various domains; herein the head node and the tail node are carried in the cross-domain separation path computation request;

compute a protection path domain sequence in the first pair of candidate separation domain sequences using the shortest path algorithm by taking pass-through paths of the working path domain sequence in the first pair of candidate separation domain sequences as a separation constraint condition;

add 1 to j, judge whether j+1 is greater than the positive integer K, and when it is judged that j+1 is not greater than K, compute a working path domain sequence in a second pair of candidate separation domain sequences which is sub-optimal relative to the working path domain sequence in the first pair of candidate separation domain sequences using a preset K-optimal path algorithm;

compute a protection path domain sequence in the second pair of candidate separation domain sequences using the shortest path algorithm by taking pass-through paths of the working path domain sequence in the second pair of candidate separation domain sequences as a separation constraint condition;

add 1 to j, judge whether j+1 is greater than the positive integer K, and when it is judged that j+1 is not greater than K, compute a working path domain sequence in a third pair of candidate separation domain sequences which is sub-optimal relative to the working path domain sequence in the second pair of candidate separation domain sequences using the preset K-optimal path algorithm;

compute a protection path domain sequence in the third pair of candidate separation domain sequences using the shortest path algorithm by taking pass-through paths of the working path domain sequence in the third pair of candidate separation domain sequences as a separation constraint condition;

and so on, until it is judged that j+1 is greater than K.

In an embodiment, the first generation unit 92 is arranged to:

for a head domain of the various domains, generate an associated path computation request each time a pair of candidate separation domain sequences in the K pairs of candidate separation domain sequences is traversed; acquire an associated path computation request generated for a $j1^{th}$ pair of candidate sequences, and determine the associated path computation request as a first association request; acquire an associated path computation request generated for a $j2^{th}$ pair of candidate sequences, and determine the associated path computation request as a second association request; and when in the K pairs of candidate separation domain sequences, an egress boundary node of a working path domain sequence in the $j1^{th}$ pair of candidate sequences in the head domain is the same as an egress boundary node of a working path domain sequence in the $j2^{th}$ pair of candidate sequences in the head domain, and an egress boundary node of a protection path domain sequence in the $j1^{th}$ pair of candidate sequences in the head domain is the same as an egress boundary node of a protection path domain sequence in the $j2^{th}$ pair of candidate sequences in the head domain, merge the first association request and the second association request into an associated path computation request, and use the merged associated path computation request as an intra-domain path computation request of the head domain;

for a tail domain of the various domains, generate an associated path computation request each time a pair of candidate separation domain sequences in the K pairs of candidate separation domain sequences is traversed; acquire an associated path computation request generated for a $j1^{th}$ pair of candidate sequences, and determine the associated path computation request as a first association request; acquire an associated path computation request generated for a $j2^{th}$ pair of candidate sequences, and determine the associated path computation request as a second association request; and when in the K pairs of candidate separation domain sequences, an egress boundary node of a working path domain sequence in the $j1^{th}$ pair of candidate sequences in the tail domain is the same as an egress boundary node of a working path domain sequence in the $j2^{th}$ pair of candidate sequences in the tail domain, and an egress boundary node of a protection path domain sequence in the $j1^{th}$ pair of candidate sequences in the tail domain is the same as an egress boundary node of a protection path domain sequence in the $j2^{th}$ pair of candidate sequences in the tail domain, merge the first association request and the second association request into an associated path computation request, and use the merged associated path computation request as an intra-domain path computation request of the tail domain;

for an intermediate domain of the various domains, when a working path domain sequence and a protection path domain sequence in a $j^{th}$ pair of candidate separation domain sequences in the K pairs of candidate separation domain sequences pass through the intermediate domain, traverse the $j^{th}$ pair of candidate separation domain sequences and generate an associated path computation request for the $j^{th}$ pair of candidate separation domain sequences; acquire an associated path computation request generated for a $j1^{th}$ pair of candidate sequences, and determine the associated path computation request as a first association request; acquire an associated path computation request generated for a $j2^{th}$ pair of candidate sequences, and determine the associated path computation request as a second association request; and when in at least two pairs of candidate separation domain sequences in which a working path domain sequence and a protection path domain sequence pass through the intermediate domain, ingress and egress boundary nodes of a working path domain sequence in the $j1^{th}$ pair of candidate sequences in the intermediate domain are correspondingly the same as ingress and egress boundary nodes of a working path domain sequence in the $j2^{th}$ pair of candidate sequences in the intermediate domain, and ingress and egress boundary nodes of a protection path domain sequence in the $j1^{th}$ pair of candidate sequences in the intermediate domain are correspondingly the same as ingress and egress boundary nodes of a protection path domain sequence in the $j2^{th}$ pair of candidate sequences in the AS domain, merge the first association request and the second association request into an associated path computation request, and use the merged associated path computation request as an intra-domain path computation request of the intermediate domain; and for an intermediate domain of the various domains, when only one of a working path domain sequence and a protection path domain sequence in the $j^{th}$ pair of candidate separation domain sequences in the K pairs of candidate separation domain sequences passes through the intermediate domain, generate a non-associated path computation request for a domain sequence which passes through the intermediate domain; acquire a non-associated path computation request generated for a working path domain sequence or a protection path domain sequence of a $j1^{th}$ pair of candidate sequences, and determine the non-associated path computation request as a first non-association request; acquire a non-associated path computation request generated for a working path domain sequence or a protection path domain sequence of a $j2^{th}$ pair of candidate sequences, and determine the non-associated path computation request as a second non-association request; and when ingress and egress boundary nodes of a domain sequence corresponding to the first non-associated path computation request in the intermediate domain are the same as ingress and egress boundary nodes of a domain sequence corresponding to the second non-associated path computation request in the intermediate domain, merge the first non-association request and the second non-association request, and use the merged non-associated path computation request as an intra-domain path computation request of the intermediate domain;

where j, j1 and j2 are positive integers, $1 \leq j \leq K$, $1 \leq j1 \leq K$, $1 \leq j2 \leq K$ and $j1 \neq j2$.

In an embodiment, the first formation unit 93 is arranged to:

in the K pairs of candidate separation domain sequences, arrange intra-domain paths in pass-through domains corresponding to a working path domain sequence in a $j^{th}$ pair of candidate separation domain sequences to corresponding positions of a working path in the $j^{th}$ pair of candidate separation domain sequences, and configure intra-domain paths in pass-through domains corresponding to a protection path domain sequence in the $j^{th}$ pair of candidate separation domain sequences to corresponding positions of a protection path in the $j^{th}$ pair of candidate separation domain sequences, to form the K pairs of candidate cross-domain separation paths;

where j is a positive integer and $1 \leq j \leq K$.

In an embodiment, the first determination unit 94 is arranged to:

compute a path cost of a working path and a path cost of a protection path in each of the K pairs of candidate cross-domain separation paths;

sum the path cost of the working path and the path cost of the protection path in each pair of candidate cross-domain separation paths to form a path cost sum; and select candidate cross-domain separation paths with the minimum path cost sum as the cross-domain separation paths.

In a practical application, the first acquisition unit 91, the first generation unit 92, the first formation unit 93, the first determination unit 94, and the first transmission unit 95 may each be implemented by a Central Processing Unit (CPU), or a Digital Signal Processor (DSP), a Micro Processor Unit (MPU), or a Field Programmable Gate Array (FPGA), and the CPU, the DSP, the MPU, and the FPGA can be built into the PCE.

An embodiment of the present disclosure further provides a path computation element PCE, which may be used as a sub-PCE in a hierarchical PCE conceptual model.

Figure 10:
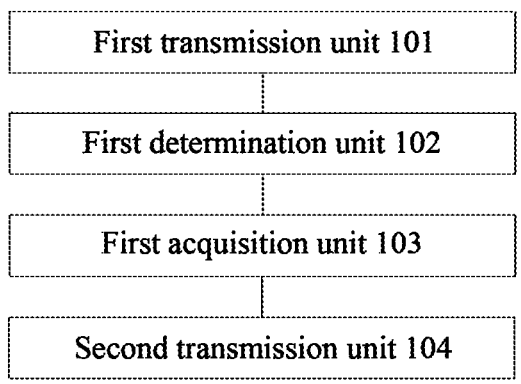
FIG. 10 is a constitutional diagram of embodiment two of a path computation element according to the present disclosure.

FIG. 10 is a diagram of constitution of embodiment two of a path computation element according to an embodiment of the present disclosure. As shown in FIG. 10, the PCE includes:

a first transmission unit 101 arranged to, when a cross-domain separation path computation request of a node is received, transmit the cross-domain separation path computation request;

a first determination unit 102 arranged to determine a type of an intra-domain path computation request received by itself;

a first acquisition unit 103 arranged to acquire at least one pair of intra-domain paths in a domain administered by itself according to the type and domain boundary nodes carried in the intra-domain path computation request, and transmit the acquired intra-domain paths; and a second transmission unit 104 arranged to receive a cross-domain separation path computation result for the cross-domain separation path computation request and transmit the received cross-domain separation path computation result to the node.

In an embodiment, the first acquisition unit 103 is located in a head domain, and is arranged to when determining that a type of an intra-domain path computation request received by itself is an associated path computation request, compute intra-domain paths in the head domain for each associated path computation request according to an egress boundary node of the head domain carried in the associated path computation request using a preset simultaneous disjoint path algorithm;

the first acquisition unit 103 is located in a tail domain, and is arranged to when determining that a type of a received intra-domain path computation request is an associated path computation request, compute intra-domain paths in the tail domain for each associated path computation request according to an ingress boundary node of the tail domain carried in the associated path computation request using the preset simultaneous disjoint path algorithm; and the first acquisition unit 103 is located in an intermediate domain and is arranged to when determining that a type of a received intra-domain path computation request includes an associated path computation request and a non-associated path computation request, for the associated path computation request, compute disjoint working path and protection path corresponding to the working path in the intermediate domain for each association request according to ingress and egress boundary nodes of the intermediate domain carried in the associated path computation request using the preset simultaneous disjoint path algorithm, and aggregate the working path and the protection path as the intra-domain paths; and for the non-associated path computation request, compute a single path in the intermediate domain according to ingress and egress boundary nodes of the intermediate domain carried in the non-association request using a preset shortest path algorithm and/or a K-optimal path algorithm, and use the single path as the intra-domain path.

Herein, the first acquisition unit 103 is located in the head domain, and is arranged to, when it is determined that the associated path computation request is received, newly add a virtual node in an intra-domain topology of the head domain and newly add virtual links through which the virtual node is connected to first and second egress boundary nodes; and form an intra-domain path computation topology of the head domain according to the virtual node and the virtual links;

in the intra-domain path computation topology of the head domain, compute a pair of shortest disjoint paths from a head node to the virtual node in the head domain using the preset simultaneous disjoint path algorithm;

separate a path from the head node to the first egress boundary node of the head domain from the pair of shortest disjoint paths to form an intra-domain working path;

separate a path from the head node to the second egress boundary node of the head domain from the pair of shortest disjoint paths to form an intra-domain protection path; and use the intra-domain working path and the intra-domain protection path as the intra-domain paths in the head domain;

herein, the first egress boundary node is an egress boundary node of a working path domain sequence of a $j^{th}$ pair of candidate separation domain sequences in the K pairs of candidate separation domain sequences acquired by the sub-PCE in the head domain; and the second egress boundary node is an egress boundary node of a protection path domain sequence of the $j^{th}$ pair of candidate separation domain sequences in the K pairs of candidate separation domain sequences acquired by the sub-PCE in the head domain, herein K and j are positive integers, and $1 \leq j \leq K$.

Herein, the first acquisition unit 103 is located in the tail domain and is arranged to when it is determined that the associated path computation request is received, newly add a virtual node in an intra-domain topology of the tail domain and newly add virtual links through which the virtual node is connected to first and second ingress boundary nodes; and form an intra-domain path computation topology of the tail domain according to the virtual node and the virtual links;

in the intra-domain path computation topology of the tail domain, compute a pair of shortest disjoint paths from the virtual node to a tail node in the tail domain using the preset simultaneous disjoint path algorithm;

separate a path from the first ingress boundary node to the tail node in the tail domain from the pair of shortest disjoint paths to form an intra-domain working path;

separate a path from the second ingress boundary node to the tail node in the tail domain from the pair of shortest disjoint paths to form an intra-domain protection path; and use the intra-domain working path and the intra-domain protection path as the intra-domain paths in the tail domain;

herein, the first ingress boundary node is an ingress boundary node of a working path domain sequence of a $j^{th}$ pair of candidate separation domain sequences in the K pairs of candidate separation domain sequences acquired by the sub-PCE in the tail domain; and the second ingress boundary node is an ingress boundary node of a protection path domain sequence of the $j^{th}$ pair of candidate separation domain sequences in the K pairs of candidate separation domain sequences acquired by the sub-PCE in the tail domain, herein K and j are positive integers, and $1 \leq j \leq K$.

Herein, the first acquisition unit 103 is located in the intermediate domain and is arranged to, when the associated path computation request is received, newly add a first virtual node and a second virtual node in an intra-domain topology of the tail domain and newly add virtual links through which the first virtual node is connected to first and second ingress boundary nodes and virtual links through which the second virtual node is connected to first and second egress boundary nodes; and form an intra-domain path computation topology of the intermediate domain according to the first virtual node, the second virtual node and the virtual links;

in the intra-domain path computation topology of the intermediate domain, compute a pair of shortest disjoint paths from the first virtual node to the second virtual node using the preset simultaneous disjoint path algorithm;

separate a path from the first ingress boundary node of the intermediate domain to the first egress boundary node of the intermediate domain from the pair of shortest disjoint paths to form an intra-domain working path;

separate a path from the second ingress boundary node of the intermediate domain to the second egress boundary node of the intermediate domain from the pair of shortest disjoint paths to form an intra-domain protection path; and use the intra-domain working path and the intra-domain protection path as the intra-domain paths in the intermediate domain;

herein, the first ingress boundary node is an ingress boundary node of a working path domain sequence of a $j^{th}$ pair of candidate separation domain sequences in the K pairs of candidate separation domain sequences acquired by the sub-PCE in the intermediate domain, and the first egress boundary node is an egress boundary node of the working path domain sequence in the intermediate domain; and the second ingress boundary node is an ingress boundary node of a protection path domain sequence of the $j^{th}$ pair of candidate separation domain sequences in the K pairs of candidate separation domain sequences acquired by the sub-PCE in the intermediate domain, and the second egress boundary node is an egress boundary node of the protection path domain sequence in the intermediate domain;

herein K and j are positive integers, and $1 \leq j \leq K$.

In a practical application, each of the first transmission unit 101, the first determination unit 102, the first acquisition unit 103, and the second transmission unit 104 may be implemented by a CPU, a DSP, an MPU, or an FPGA etc.; and the DSP, the MPU, and the FPGA can be built in the PCE.

It will be understood by those skilled in the art that the implementation functions of the various processing units in the PCE shown in FIGS. 9 and 10 can be understood with reference to the foregoing description of the method for acquiring a cross-domain separation path. It will be understood by those skilled in the art that the functions of the various processing units in the PCEs shown in FIGS. 9 and 10 can be implemented by a program running on a processor or by a specific logic circuit.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (including but not limited to a disk memory and an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate an apparatus for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including an instruction apparatus for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

The above description is merely alternative embodiments of the present disclosure, and is not intended to limit the protection scope of the present disclosure.

INDUSTRIAL APPLICABILITY

The method for acquiring a cross-domain separation path, the related path computation element, and the related computer storage medium are disclosed according to the embodiments of the present disclosure, herein, the method includes: when a cross-domain separation path computation request is received, acquiring K pairs of candidate separation domain sequences according to a cross-domain network abstraction topology; traversing the K pairs of candidate separation domain sequences, generating corresponding intra-domain path computation requests for domains through which various candidate separation domain sequences in the network pass, and transmitting the intra-domain path computation requests of the various domains; when at least one pair of intra-domain paths for the intra-domain path computation requests are received, configuring each intra-domain path of the at least one pair of intra-domain paths to a corresponding position in the K pairs of candidate separation domain sequences, to form K pairs of candidate cross-domain separation paths; determining one pair of cross-domain separation paths from the K pairs of candidate cross-domain separation paths, and transmitting the cross-domain separation paths as a computation result of the cross-domain separation path computation request; wherein K is a positive integer. With the embodiments of the present disclosure, a success ratio of acquisition of a cross-domain separation path can be increased, and a domain sequence between a head domain and a tail domain of an end-to-end path needs not to be known in advance.

What is claimed is:

1. A method for acquiring a cross-domain separation path, comprising:

when a cross-domain separation path computation request of a node is received, one of at least one sub-Path Computation Element PCE which is used to administer a domain to which the node belongs transmitting the cross-domain separation path computation request;

each of the at least one sub-PCE determining a type of an intra-domain path computation request received by the sub-PCE itself, acquiring at least one pair of intra-domain paths in a domain administered by the sub-PCE itself according to the type and domain boundary nodes carried in the intra-domain path computation request, and transmitting the acquired intra-domain paths; and receiving a cross-domain separation path computation result for the cross-domain separation path computation request and transmitting the received cross-domain separation path computation result to the node;

wherein each of the at least one sub-PCE determining a type of the intra-domain path computation request received by the sub-PCE itself, acquiring at least one pair of intra-domain paths in a domain to which the sub-PCE itself belongs according to the type and the domain boundary nodes carried in the intra-domain path computation request comprises:

when a type of an intra-domain path computation request received by a sub-PCE which is used to compute intra-domain paths in a head domain is an associated path computation request, computing intra-domain paths in the head domain for each associated path computation request according to an egress boundary node of the head domain carried in the associated path computation request using a preset simultaneous disjoint path algorithm;

when a type of an intra-domain path computation request received by a sub-PCE which is used to compute intra-domain paths in a tail domain is an associated path computation request, computing intra-domain paths in the tail domain for each associated path computation request according to an ingress boundary node of the tail domain carried in the associated path computation request using the preset simultaneous disjoint path algorithm; and when a type of an intra-domain path computation request received by a sub-PCE which is used to compute intra-domain paths in an intermediate domain comprises an associated path computation request and a non-associated path computation request, for the associated path computation request, computing disjoint working path and protection path corresponding to the working path in the intermediate domain for each association request according to ingress and egress boundary nodes of the intermediate domain carried in the associated path computation request using the preset simultaneous disjoint path algorithm, and aggregating the working path and the protection path as the intra-domain paths; and for the non-associated path computation request, computing a single path in the intermediate domain according to ingress and egress boundary nodes of the intermediate domain carried in the non-association request using a preset shortest path algorithm and/or a K-optimal path algorithm, and using the single path as the intra-domain path.

2. The method according to claim 1, further comprising:
when the sub-PCE which is used to compute the intra-domain paths in the head domain receives the associated path computation request, newly adding a virtual node in an intra-domain topology of the head domain and newly adding virtual links through which the virtual node is connected to first and second egress boundary nodes;

forming an intra-domain path computation topology of the head domain according to the virtual node and the virtual links;

in the intra-domain path computation topology of the head domain, computing a pair of shortest disjoint paths from a head node to the virtual node in the head domain using the preset simultaneous disjoint path algorithm;

separating a path from the head node to the first egress boundary node of the head domain from the pair of shortest disjoint paths to form an intra-domain working path;

separating a path from the head node to the second egress boundary node of the head domain from the pair of shortest disjoint paths to form an intra-domain protection path; and using the intra-domain working path and the intra-domain protection path as the intra-domain paths in the head domain;

wherein, the first egress boundary node is an egress boundary node of a working path domain sequence of a $j^{th}$ pair of candidate separation domain sequences in the K pairs of candidate separation domain sequences acquired by the sub-PCE in the head domain; and the second egress boundary node is an egress boundary node of a protection path domain sequence of the $j^{th}$ pair of candidate separation domain sequences in the K pairs of candidate separation domain sequences acquired by the sub-PCE in the head domain, wherein K and j are positive integers, and $1 \leq j \leq K$.

3. The method according to claim 1, further comprising:
when the sub-PCE which is used to compute the intra-domain paths in the tail domain receives the associated path computation request, newly adding a virtual node in an intra-domain topology of the tail domain and newly adding virtual links through which the virtual node is connected to first and second ingress boundary nodes;

forming an intra-domain path computation topology of the tail domain according to the virtual node and the virtual links;

in the intra-domain path computation topology of the tail domain, computing a pair of shortest disjoint paths from the virtual node to a tail node in the tail domain using the preset simultaneous disjoint path algorithm;

separating a path from the first ingress boundary node to the tail node in the tail domain from the pair of shortest disjoint paths to form an intra-domain working path;

separating a path from the second ingress boundary node to the tail node in the tail domain from the pair of shortest disjoint paths to form an intra-domain protection path; and using the intra-domain working path and the intra-domain protection path as the intra-domain paths in the tail domain;

wherein, the first ingress boundary node is an ingress boundary node of a working path domain sequence of a $j^{th}$ pair of candidate separation domain sequences in the K pairs of candidate separation domain sequences acquired by the sub-PCE in the tail domain; and the second ingress boundary node is an ingress boundary node of a protection path domain sequence of the $j^{th}$ pair of candidate separation domain sequences in the K pairs of candidate separation domain sequences acquired by the sub-PCE in the tail domain, wherein K and j are positive integers, and $1 \leq j \leq K$.

4. The method according to claim 1, further comprising:
when the sub-PCE which is used to compute the intra-domain paths in the intermediate domain receives the associated path computation request, newly adding a first virtual node and a second virtual node in an intra-domain topology of the tail domain and newly adding virtual links through which the first virtual node is connected to first and second ingress boundary nodes and virtual links through which the second virtual node is connected to first and second egress boundary nodes;

forming an intra-domain path computation topology of the intermediate domain according to the first virtual node, the second virtual node and the virtual links;

in the intra-domain path computation topology of the intermediate domain, computing a pair of shortest disjoint paths from the first virtual node to the second virtual node using the preset simultaneous disjoint path algorithm;

separating a path from the first ingress boundary node of the intermediate domain to the first egress boundary node of the intermediate domain from the pair of shortest disjoint paths to form an intra-domain working path;

separating a path from the second ingress boundary node of the intermediate domain to the second egress boundary node of the intermediate domain from the pair of shortest disjoint paths to form an intra-domain protection path; and using the intra-domain working path and the intra-domain protection path as the intra-domain paths in the intermediate domain;

wherein, the first ingress boundary node is an ingress boundary node of a working path domain sequence of a $j^{th}$ pair of candidate separation domain sequences in the K pairs of candidate separation domain sequences acquired by the sub-PCE in the intermediate domain, and the first egress boundary node is an egress boundary node of the working path domain sequence in the intermediate domain; and the second ingress boundary node is an ingress boundary node of a protection path domain sequence of the $j^{th}$ pair of candidate separation domain sequences in the K pairs of candidate separation domain sequences acquired by the sub-PCE in the intermediate domain, and the second egress boundary node is an egress boundary node of the protection path domain sequence in the intermediate domain;

wherein K and j are positive integers, and $1 \le j \le K$.

5. A computer storage medium, in which a second set of computer-executable instructions are stored, wherein the second set of computer-executable instructions are used to perform the method for acquiring a cross-domain separation path according to claim 1.

6. A path computation element, comprising a memory storing instructions and a processor which is arranged to execute the instructions in the memory to:

when a cross-domain separation path computation request of a node is received, transmit the cross-domain separation path computation request;

determine a type of an intra-domain path computation request received by itself;

acquire at least one pair of intra-domain paths in a domain administered by itself according to the type and domain boundary nodes carried in the intra-domain path computation request, and transmit the acquired intra-domain paths; and receive a cross-domain separation path computation result for the cross-domain separation path computation request and transmit the received cross-domain separation path computation result to the node;

wherein, the processor is arranged to:

when the path computation element is located in a head domain, and when determining that a type of an intra-domain path computation request received by itself is an associated path computation request, compute intra-domain paths in the head domain for each associated path computation request according to an egress boundary node of the head domain carried in the associated path computation request using a preset simultaneous disjoint path algorithm;

when the path computation element is located in a tail domain, and when determining that a type of a received intra-domain path computation request is an associated path computation request, compute intra-domain paths in the tail domain for each associated path computation request according to an ingress boundary node of the tail domain carried in the associated path computation request using the preset simultaneous disjoint path algorithm; and when the path computation element is located in an intermediate domain and when determining that a type of a received intra-domain path computation request comprises an associated path computation request and a non-associated path computation request, for the associated path computation request, compute disjoint working path and protection path corresponding to the working path in the intermediate domain for each association request according to ingress and egress boundary nodes of the intermediate domain carried in the associated path computation request using the preset simultaneous disjoint path algorithm, and aggregate the working path and the protection path as the intra-domain paths and for the non-associated path computation request, compute a single path in the intermediate domain according to ingress and egress boundary nodes of the intermediate domain carried in the non-association request using a preset shortest path algorithm and/or a K-optimal path algorithm, and use the single path as the intra-domain path.

7. The path computation element according to claim 6, wherein, the processor is arranged to:

when the path computation element is located in the head domain, and when it is determined that the associated path computation request is received, newly add a virtual node in an intra-domain topology of the head domain and newly add virtual links through which the virtual node is connected to first and second egress boundary nodes;

form an intra-domain path computation topology of the head domain according to the virtual node and the virtual links;

in the intra-domain path computation topology of the head domain, compute a pair of shortest disjoint paths from a head node to the virtual node in the head domain using the preset simultaneous disjoint path algorithm;

separate a path from the head node to the first egress boundary node of the head domain from the pair of shortest disjoint paths to form an intra-domain working path;

separate a path from the head node to the second egress boundary node of the head domain from the pair of shortest disjoint paths to form an intra-domain protection path; and use the intra-domain working path and the intra-domain protection path as the intra-domain paths in the head domain;

wherein, the first egress boundary node is an egress boundary node of a working path domain sequence of a $j^{th}$ pair of candidate separation domain sequences in the K pairs of candidate separation domain sequences acquired by the sub-PCE in the head domain; and the second egress boundary node is an egress boundary node of a protection path domain sequence of the $j^{th}$ pair of candidate separation domain sequences in the K pairs of candidate separation domain sequences acquired by the sub-PCE in the head domain, wherein K and j are positive integers, and $1 \le j \le K$.

8. The path computation element according to claim 6, wherein, the processor is arranged to:

when the path computation element is located in the tail domain and when it is determined that the associated path computation request is received, newly add a virtual node in an intra-domain topology of the tail domain and newly add virtual links through which the virtual node is connected to first and second ingress boundary nodes;

form an intra-domain path computation topology of the tail domain according to the virtual node and the virtual links;

in the intra-domain path computation topology of the tail domain, compute a pair of shortest disjoint paths from the virtual node to a tail node in the tail domain using the preset simultaneous disjoint path algorithm;

separate a path from the first ingress boundary node to the tail node in the tail domain from the pair of shortest disjoint paths to form an intra-domain working path;

separate a path from the second ingress boundary node to the tail node in the tail domain from the pair of shortest disjoint paths to form an intra-domain protection path; and use the intra-domain working path and the intra-domain protection path as the intra-domain paths in the tail domain;

wherein, the first ingress boundary node is an ingress boundary node of a working path domain sequence of a $j^{th}$ pair of candidate separation domain sequences in the K pairs of candidate separation domain sequences acquired by the sub-PCE in the tail domain; and the second ingress boundary node is an ingress boundary node of a protection path domain sequence of the $j^{th}$ pair of candidate separation domain sequences in the K pairs of candidate separation domain sequences acquired by the sub-PCE in the tail domain, wherein K and j are positive integers, and $1 \leq j \leq K$.

9. The path computation element according to claim 6, wherein, the processor is arranged to:

when the path computation element is located in the intermediate domain and when the associated path computation request is received, newly add a first virtual node and a second virtual node in an intra-domain topology of the tail domain and newly add virtual links through which the first virtual node is connected to first and second ingress boundary nodes and virtual links through which the second virtual node is connected to first and second egress boundary nodes;

form an intra-domain path computation topology of the intermediate domain according to the first virtual node, the second virtual node and the virtual links;

in the intra-domain path computation topology of the intermediate domain, compute a pair of shortest disjoint paths from the first virtual node to the second virtual node using the preset simultaneous disjoint path algorithm;

separate a path from the first ingress boundary node of the intermediate domain to the first egress boundary node of the intermediate domain from the pair of shortest disjoint paths to form an intra-domain working path;

separate a path from the second ingress boundary node of the intermediate domain to the second egress boundary node of the intermediate domain from the pair of shortest disjoint paths to form an intra-domain protection path; and use the intra-domain working path and the intra-domain protection path as the intra-domain paths in the intermediate domain;

wherein, the first ingress boundary node is an ingress boundary node of a working path domain sequence of a $j^{th}$ pair of candidate separation domain sequences in the K pairs of candidate separation domain sequences acquired by the sub-PCE in the intermediate domain, and the first egress boundary node is an egress boundary node of the working path domain sequence in the intermediate domain; and the second ingress boundary node is an ingress boundary node of a protection path domain sequence of the $j^{th}$ pair of candidate separation domain sequences in the K pairs of candidate separation domain sequences acquired by the sub-PCE in the intermediate domain, and the second egress boundary node is an egress boundary node of the protection path domain sequence in the intermediate domain;

wherein K and j are positive integers, and $1 \leq j \leq K$.

* * * * *